US012395992B2

(12) United States Patent
Karaki et al.

(10) Patent No.: US 12,395,992 B2
(45) Date of Patent: Aug. 19, 2025

(54) TRANSMIT FEEDBACK FOR UNLICENSED NETWORKS

(71) Applicant: Telefonaktiebolaget LM Ericsson (publ), Stockholm (SE)

(72) Inventors: Reem Karaki, Aachen (DE); Stephen Grant, Pleasanton, CA (US); Min Wang, Luleå (SE); Tai Do, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 17/614,757

(22) PCT Filed: Jun. 15, 2020

(86) PCT No.: PCT/SE2020/050617
§ 371 (c)(1),
(2) Date: Nov. 29, 2021

(87) PCT Pub. No.: WO2020/256623
PCT Pub. Date: Dec. 24, 2020

(65) Prior Publication Data
US 2022/0232557 A1 Jul. 21, 2022

Related U.S. Application Data

(60) Provisional application No. 62/864,067, filed on Jun. 20, 2019.

(51) Int. Cl.
*H04W 72/21* (2023.01)
*H04W 16/14* (2009.01)
*H04W 74/0808* (2024.01)

(52) U.S. Cl.
CPC ........... *H04W 72/21* (2023.01); *H04W 16/14* (2013.01); *H04W 74/0808* (2013.01)

(58) Field of Classification Search
CPC . H04W 72/21; H04W 16/14; H04W 74/0808; H04W 72/23
See application file for complete search history.

(56) References Cited

U.S. PATENT DOCUMENTS 3,781,684 A * 12/1973 Inslerman ................ H04B 1/54
455/11.1
11,019,612 B2 * 5/2021 Ang ..................... H04L 1/1812
(Continued)

FOREIGN PATENT DOCUMENTS

WO 2018047887 A1 3/2018

OTHER PUBLICATIONS

Intel Corporation, Wideband operation for NR-unlicensed, Apr. 8, 2019, 3GPP TSG RAN WG1 Meeting #96bis R1-1904289 Xi'an, China, 6 pages (Year: 2019).*

(Continued)

*Primary Examiner* — Mounir Moutaouakil
(74) *Attorney, Agent, or Firm* — Sage Patent Group

(57) ABSTRACT

A method, system and apparatus are disclosed for transmitting feedback information when operating in unlicensed portions of the radio frequency spectrum. In one embodiment, a wireless device is configured to receive a configuration for a 5 plurality of channels, the configuration configuring each of the plurality of channels with at least one physical uplink control channel, PUCCH, resource; and transmit feedback on the at least one PUCCH resource that is configured in at least one channel of the plurality of channels. In another embodiment, a network node is configured to transmit a configuration for a plurality of channels, the configuration 10 configuring each of the plurality of channels with at least one physical uplink control channel, (Continued)

PUCCH, resource; and receive feedback on the at least one PUCCH resource that is configured in at least one channel of the plurality of channels.

20 Claims, 10 Drawing Sheets

(56) References Cited

U.S. PATENT DOCUMENTS

| | | | | |
|---|---|---|---|---|
| 12,048,002 | B2* | 7/2024 | Thangarasa | H04W 74/08 |
| 2012/0003945 | A1* | 1/2012 | Liu | H04L 1/0026 |
| | | | | 455/91 |
| 2017/0280440 | A1 | 9/2017 | Oh et al. | |
| 2019/0268929 | A1* | 8/2019 | Lee | H04W 72/21 |
| 2021/0352731 | A1* | 11/2021 | Yang | H04L 1/1858 |
| 2022/0116952 | A1* | 4/2022 | Lee | H04W 72/0446 |
| 2022/0183002 | A1* | 6/2022 | Yeo | H04L 1/1854 |
| 2022/0209923 | A1* | 6/2022 | Gao | H04L 1/1812 |
| 2022/0247537 | A1* | 8/2022 | Almquist | H04L 5/0053 |
| 2022/0377785 | A1* | 11/2022 | Yao | H04W 76/30 |

OTHER PUBLICATIONS

International Search Report and Written Opinion dated Sep. 18, 2020 for International Application No. PCT/SE2020/050617 filed Jun. 15, 2020, consisting of 14 pages.

3GPP TSG RAN WG1 #96 R1-1902042; Title: HARQ procedure for NR-U; Agenda Item: 7.2.2.2.3; Source: LG Electronics; Document for: Discussion and decision; Date and Location: Feb. 25-Mar. 1, 2019, Athens, Greece; consisting of 10 pages.

3GPP TSG RAN WG1 #97 R1-1906545; Title: Enhancements to HARQ for NR-U operation; Agenda Item: 7.2.2.2.3; Source: MediaTek Inc.; Document for: Discussion and Decision; Date and Location: May 13-17, 2019, Reno, USA; consisting of 11 pages.

3GPP TSG RAN WG1 #97 R1-1906922; Title: HARQ enhancements for NR-U; Agenda item: 7.2.2.2.3; Source: Samsung; Document for: Discussion and Decision; Date and Location: May 13-17, 2019, Reno, USA; consisting of 7 pages.

3GPP TSG RAN WG1 Meeting #97 R1-1906046; Title: HARQ enhancements in NR unlicensed; Agenda Item: 7.2.2.2.3; Source: Huawei, HiSilicon; Document for: Discussion and decision; Date and Location: May 13-17, 2019, Reno, USA; consisting of 14 pages.

Chinese Office Action and English Summary dated Nov. 29, 2022 for Application No. 2021-574292, consisting of 19 pages.

3GPP TSG RAN WG1 Meeting #97 R1-1907214; Title: HARQ enhancement for NR unlicensed operation; Source: Sharp; Agenda Item: 7.2.2.2.3; Document for: Discussion and Decision; Location and Date: Reno, Nevada, US, May 13-17, 2019, consisting of 8 pages.

3GPP TSG RAN WG1 Meeting #97 R1-1907652; Title: Feature lead summary of HARQ enhancements for NR-U; Agenda item: 7.2.2.2.3; Source: Huawei; Document for: Discussion and Decision; Location and Date: Reno, USA, May 13-17, 2019, consisting of 22 pages.

* cited by examiner

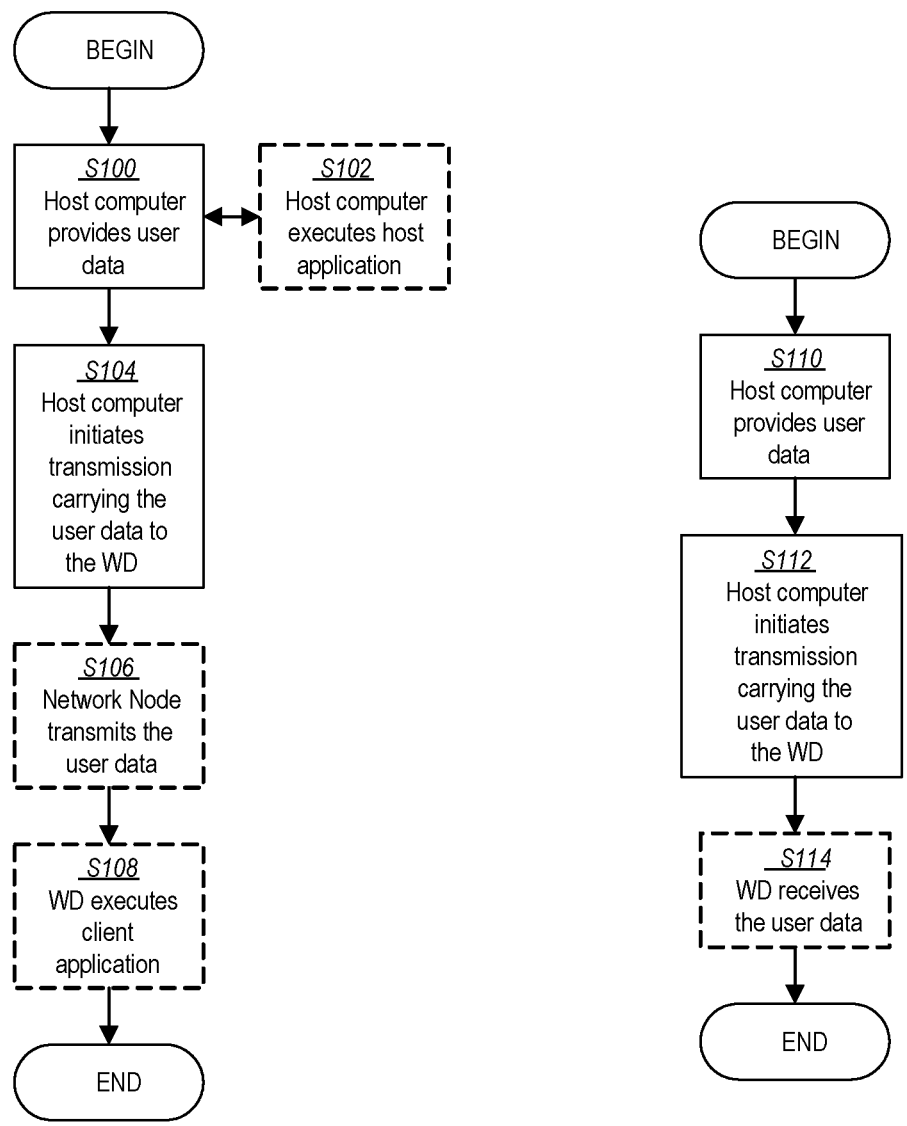

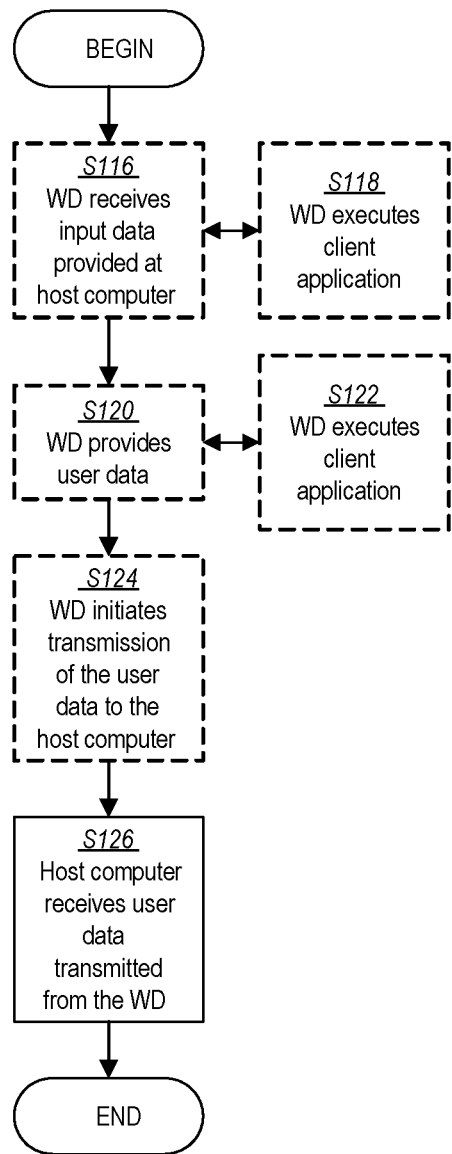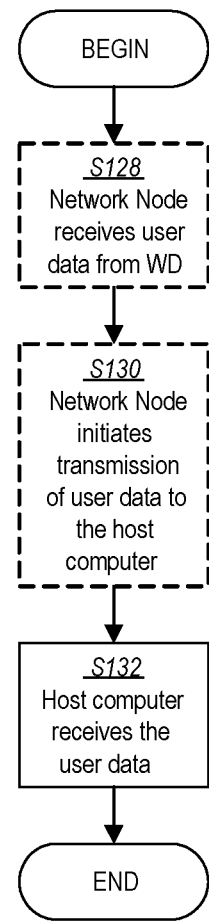
FIG. 7
FIG. 8

_US 12,395,992 B2_

TRANSMIT FEEDBACK FOR UNLICENSED NETWORKS

CROSS-REFERENCE TO RELATED APPLICATIONS

This application is a Submission Under 35 U.S.C. § 371 for U.S. National Stage Patent Application of International Application No.: PCT/SE2020/050617, filed Jun. 15, 2020 entitled "TRANSMIT FEEDBACK FOR UNLICENSED NETWORKS," which claims priority to U.S. Provisional Application No.: 62/864,067, filed Jun. 20, 2019, entitled "TRANSMIT FEEDBACK FOR UNLICENSED NETWORKS," the entireties of both of which are incorporated herein by reference.

TECHNICAL FIELD

The present disclosure relates to wireless communications, and in particular, to methods and systems for a wireless device to transmit feedback information to a node when operating in unlicensed portions of the radio frequency spectrum.

BACKGROUND

Currently the 5th generation of cellular system, also called New Radio (NR), is being standardized in the 3rd Generation Partnership Project (3GPP). NR is developed to support multiple and substantially different use cases. Besides the typical mobile broadband use case, machine type communication (MTC), ultra-low latency critical communications (ULLCC), side-link device-to-device (D2D) and several other use cases are also supported.

In NR, the basic scheduling unit is called a slot. A slot includes 14 orthogonal frequency division multiplexing (OFDM) symbols for the normal cyclic prefix configuration. NR supports many different subcarrier spacing configurations and at a subcarrier spacing of 30 kHz the OFDM symbol duration is ~33 microseconds (us). As an example, a slot with 14 symbols for the same subcarrier-spacing (SCS) is 500 us long (including cyclic prefixes).

NR also supports flexible bandwidth configurations for different wireless devices (WD) on the same serving cell. In other words, the bandwidth monitored by a WD and used for its control and data channels may be smaller than the carrier bandwidth. One or multiple bandwidth part configurations for each component carrier can be semi-statically signaled to a WD, where a bandwidth part consists of a group of contiguous physical resource blocks (PRB). Reserved resources can be configured within the bandwidth part. The bandwidth of a bandwidth part is equal to or is smaller than the maximum bandwidth capability supported by a WD.

NR is targeting both licensed and unlicensed bands, and a work item named NR-based Access to Unlicensed Spectrum (NR-U) was started. Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3GPP operators, and, ultimately, to the 3GPP industry as a whole. It is expected that some features in NR may be adapted to comply with the special characteristics of the unlicensed band as well as also different regulations. A subcarrier spacing of 15 or 30 kHz are the most promising candidates for NR-U OFDM numerologies for frequencies below 6 GHz.

When operating in unlicensed spectrum, many regions in the world require a device to sense the medium as free before transmitting. This operation is often referred to as a listen before talk (LBT) operation. There are many different variants of LBT, which may depend on which radio technology the device uses and which type of data it wants to transmit at the moment. Common to all variants is that the sensing is done in a particular channel (corresponding to a defined carrier frequency) and over a predefined bandwidth. For example, in the 5 GHz band, the sensing is done over 20 MHz channels.

Many wireless devices are capable of transmitting (and receiving) over a wide bandwidth including of multiple sub-bands/channels, e.g., LBT sub-band (i.e., the frequency part with bandwidth equal to the LBT bandwidth). A wireless device is only allowed to transmit on the sub-bands where the medium is sensed as free. Again, there are different flavors of how the sensing should be done when multiple sub-bands are involved.

In principle, there are at least two ways a wireless device can operate over multiple sub-bands. One way is that the transmitter/receiver bandwidth is changed depending on which sub-bands that were sensed as free. In this setup, there is only one component carrier (CC) and the multiple sub-bands are treated as a single channel with a larger bandwidth. The other way is that the wireless device operates almost independent processing chains for each channel. Depending on how independent the processing chains are, this option can be referred to as either carrier aggregation (CA) or dual connectivity (DC).

In NR licensed operation, when operating with CA, the feedback information or physical uplink control channel (PUCCH) for multiple downlink CCs is grouped and transmitted on the primary cell (primary carrier) as a baseline. This is to reduce the uplink control overhead and to support asymmetric CA with the number of downlink carriers not being equal to the number of uplink carriers. However, for a large number of downlink CCs, a single uplink carrier may have to carry a large number of feedbacks, which may overload the payload field in the PUCCH. Thus, NR supports the configuring of two PUCCH groups where feedback relating to the first group is transmitted in the uplink of the primary cell (PCell) and feedback relating to the other group is transmitted on the primary second cell (PSCell) or on a PUCCH-secondary cell (SCell).

FIG. 1 illustrates the use of multiple PUCCH groups for NR, where PUCCH groups are transmitted on a PCell and a PSCell. FIG. 2 shows an example of the feedback mechanism with multiple PUCCH groups, in which the feedback for the first 4 downlink (DL) CCs may be transmitted in the uplink (UL) PCell and the feedback for the last 2 DL CCs may be transmitted in the UL PSCell. This is often the case for DC.

The cross-carriers feedback mechanism in 3GPP Rel-15 NR is designed for licensed operations, where the availability of the UL PCell and/or UL PSCell/PUCCH-SCell is certain. In NR-U however, UL PCell and/or PSCell/PUCCH-SCell are not always available. The reason could be due to listen before talk (LBT) operation or due to network configurations.

SUMMARY

Some embodiments advantageously provide methods, systems, and apparatuses for providing flexibility for hybrid automatic repeat request acknowledgement (HARQ-ACK) feedback transmission that is needed for unlicensed operation, unlike licensed operation where PUCCH transmission is restricted to PCell or PSCell or one PUCCH-SCell. This increases opportunities for a WD to transmit feedback information considering that the PCell and/or PSCell are not always available in unlicensed operations. Advantageously, embodiments of the methods and systems create only minor specification impacts and little to no extra signaling overhead.

According to one aspect of the present disclosure, a method implemented in a wireless device, WD, is provided. The method includes receiving a configuration for a plurality of channels, the configuration configuring each of the plurality of channels with at least one physical uplink control channel, PUCCH, resource; and transmitting feedback on the at least one PUCCH resource that is configured in at least one channel of the plurality of channels.

In some embodiments of this aspect, the at least one channel on which the feedback is transmitted is based at least in part on a Listen-before-talk, LBT, category associated with the at least one channel. In some embodiments of this aspect, the method further includes receiving a downlink control information, DCI, the LBT category being based on LBT information indicated in the DCI. In some embodiments of this aspect, the at least one channel on which the feedback is transmitted corresponds to the at least one channel within a PUCCH group in which a Listen-before-talk, LBT, procedure is not used. In some embodiments of this aspect, the at least one channel on which the feedback is transmitted is based at least in part on a lowest serving cell index within a PUCCH group. In some embodiments of this aspect, the at least one channel on which the feedback is transmitted corresponds to the at least one channel having a shortest sensing duration within a PUCCH group.

In some embodiments of this aspect, the at least one channel on which the feedback is transmitted corresponds to the at least one channel associated with at least one of a lowest channel occupancy and a lowest Listen-before-talk, LBT, failure statistic. In some embodiments of this aspect, the at least one channel on which the feedback is transmitted is a same channel that the WD received a corresponding downlink scheduling to which the feedback is related. In some embodiments of this aspect, the method further includes transmitting at least one duplicate of the feedback for at least one of: all the channels of the plurality of channels within a PUCCH group; channels for which the WD received a downlink scheduling; and a subset of the plurality of channels explicitly indicated by the network node.

In some embodiments of this aspect, the received configuration configures the WD with a plurality of PUCCH groups, each PUCCH group being assigned at least one of the plurality of channels. In some embodiments of this aspect, the method further includes receiving at least one downlink control information, DCI, comprising at least one index indicating the at least one channel to be used for the feedback transmission. In some embodiments of this aspect, the at least one DCI comprising the at least one index received by the WD is duplicated in all downlink channels associated with the WD. In some embodiments of this aspect, the method further includes receiving signaling indicating a set of channel candidates for the feedback transmission; and selecting the at least one channel out of the indicated set of channel candidates for the feedback transmission. In some embodiments of this aspect, transmitting the feedback includes transmitting the feedback in the selected at least one channel.

In some embodiments of this aspect, selecting the at least one channel out of the indicated set of channel candidates further comprises: selecting the at least one channel out of the indicated set of channel candidates for the feedback transmission based at least in part on at least one of: a predefined order; the at least one channel associated with a downlink transmission; the at least one channel associated with an uplink transmission; the at least one channel associated with a Listen-before-talk, LBT, category; the at least one channel in which an LBT procedure is not used; the at least one channel associated with a lowest serving cell index within a PUCCH group; the at least one channel having a shortest sensing duration within a PUCCH group; the at least one channel associated with at least one of a lowest channel occupancy and a lowest Listen-before-talk, LBT, failure statistic; and the at least one channel in which the WD received a downlink scheduling.

In some embodiments of this aspect, the method further includes if the at least one PUCCH resource overlaps a physical uplink shared channel, PUSCH, transmission, multiplexing the feedback with the PUSCH transmission. In some embodiments of this aspect, the method further includes receiving a downlink control information, DCI, the DCI indicating a timing for the feedback on the at least one PUCCH resource; receiving an uplink, UL, grant on a physical uplink shared channel, PUSCH; and based at least in part on a Listen-before-talk, LBT, outcome, selecting one of the at least one PUCCH resource and the PUSCH to transmit the feedback. In some embodiments of this aspect, the feedback comprises at least one of uplink control information, UCI, Hybrid Automatic Repeat reQuest, HARQ, acknowledgement, ACK, a channel state information, CSI, and a scheduling request. In some embodiments of this aspect, the plurality of channels corresponds to one of a plurality of sub-bands in an unlicensed spectrum, a plurality of carriers, and a plurality of cells.

According to another aspect of the present disclosure, a method implemented in a network node configured to communicate with a wireless device, WD, is provided. The method includes transmitting a configuration for a plurality of channels, the configuration configuring each of the plurality of channels with at least one physical uplink control channel, PUCCH, resource; and receiving feedback on the at least one PUCCH resource that is configured in at least one channel of the plurality of channels.

In some embodiments of this aspect, the at least one channel on which the feedback is received is based at least in part on a Listen-before-talk, LBT, category associated with the at least one channel. In some embodiments of this aspect, the method further includes transmitting a downlink control information, DCI, the LBT category being based on LBT information indicated in the DCI. In some embodiments of this aspect, the at least one channel on which the feedback is received corresponds to the at least one channel within a PUCCH group in which a Listen-before-talk, LBT, procedure is not used. In some embodiments of this aspect, the at least one channel on which the feedback is received is based at least in part on a lowest serving cell index within a PUCCH group.

In some embodiments of this aspect, the at least one channel on which the feedback is received corresponds to the at least one channel having a shortest sensing duration within a PUCCH group. In some embodiments of this aspect, the at least one channel on which the feedback is received corresponds to the at least one channel associated with at least one of a lowest channel occupancy and a lowest Listen-before-talk, LBT, failure statistic. In some embodiments of this aspect, the at least one channel on which the feedback is received is a same channel that the WD received a corresponding downlink scheduling to which the feedback is related. In some embodiments of this aspect, the method further includes receiving at least one duplicate of the feedback in at least one of: at least one channel of the plurality of channels within a PUCCH group; at least one channel for which the WD received a downlink scheduling; and at least one channel within a subset of the plurality of channels explicitly indicated by the network node.

In some embodiments of this aspect, the configuration configures the WD with a plurality of PUCCH groups, each PUCCH group being assigned at least one of the plurality of channels. In some embodiments of this aspect, the method further includes transmitting at least one downlink control information, DCI, comprising at least one index indicating the at least one channel to be used for the feedback transmission. In some embodiments of this aspect, the at least one DCI comprising the at least one index is duplicated in all downlink channels associated with the WD. In some embodiments of this aspect, the method further includes transmitting signaling indicating a set of channel candidates for the feedback transmission. In some embodiments of this aspect, the feedback is received in the at least one channel that is selected out of the indicated set of channel candidates.

In some embodiments of this aspect, the at least one channel that is selected out of the indicated set of channel candidates is selected based at least in part on at least one of: a predefined order; the at least one channel associated with a downlink transmission; the at least one channel associated with an uplink transmission; the at least one channel associated with a Listen-before-talk, LBT, category; the at least one channel in which an LBT procedure is not used; the at least one channel associated with a lowest serving cell index within a PUCCH group; the at least one channel having a shortest sensing duration within a PUCCH group; the at least one channel associated with at least one of a lowest channel occupancy and a lowest Listen-before-talk, LBT, failure statistic; and the at least one channel in which the WD received a downlink scheduling.

In some embodiments of this aspect, the method further includes if the at least one PUCCH resource overlaps a physical uplink shared channel, PUSCH, transmission, receiving the feedback as multiplexed with the PUSCH transmission. In some embodiments of this aspect, the method further includes transmitting a downlink control information, DCI, the DCI indicating a timing for the feedback on the at least one PUCCH resource; transmitting an uplink, UL, grant on a physical uplink shared channel, PUSCH; and based at least in part on a Listen-before-talk, LBT, outcome of the WD, receiving the feedback in one of the at least one PUCCH resource and the PUSCH. In some embodiments of this aspect, the feedback comprises at least one of uplink control information, UCI, Hybrid Automatic Repeat reQuest, HARQ, acknowledgement, ACK, a channel state information, CSI, and a scheduling request. In some embodiments of this aspect, the plurality of channels corresponds to one of a plurality of sub-bands in an unlicensed spectrum, a plurality of carriers, and a plurality of cells.

According to another aspect of the present disclosure, a wireless device, WD, includes processing circuitry. The processing circuitry is configured to cause the WD to receive a configuration for a plurality of channels, the configuration configuring each of the plurality of channels with at least one physical uplink control channel, PUCCH, resource; and transmit feedback on the at least one PUCCH resource that is configured in at least one channel of the plurality of channels.

In some embodiments of this aspect, the at least one channel on which the feedback is transmitted is based at least in part on a Listen-before-talk, LBT, category associated with the at least one channel. In some embodiments of this aspect, the processing circuitry is further configured to cause the WD to receive a downlink control information, DCI, the LBT category being based on LBT information indicated in the DCI. In some embodiments of this aspect, the at least one channel on which the feedback is transmitted corresponds to the at least one channel within a PUCCH group in which a Listen-before-talk, LBT, procedure is not used. In some embodiments of this aspect, the at least one channel on which the feedback is transmitted is based at least in part on a lowest serving cell index within a PUCCH group.

In some embodiments of this aspect, the at least one channel on which the feedback is transmitted corresponds to the at least one channel having a shortest sensing duration within a PUCCH group. In some embodiments of this aspect, the at least one channel on which the feedback is transmitted corresponds to the at least one channel associated with at least one of a lowest channel occupancy and a lowest Listen-before-talk, LBT, failure statistic. In some embodiments of this aspect, the at least one channel on which the feedback is transmitted is a same channel that the WD received a corresponding downlink scheduling to which the feedback is related. In some embodiments of this aspect, the processing circuitry is configured to cause the WD to transmit at least one duplicate of the feedback for at least one of: all the channels of the plurality of channels within a PUCCH group; channels for which the WD received a downlink scheduling; and a subset of the plurality of channels explicitly indicated by the network node.

In some embodiments of this aspect, the received configuration configures the WD with a plurality of PUCCH groups, each PUCCH group being assigned at least one of the plurality of channels. In some embodiments of this aspect, the processing circuitry is further configured to cause the WD to receive at least one downlink control information, DCI, comprising at least one index indicating the at least one channel to be used for the feedback transmission. In some embodiments of this aspect, the at least one DCI comprising the at least one index received by the WD is duplicated in all downlink channels associated with the WD. In some embodiments of this aspect, the processing circuitry is further configured to cause the WD to receive signaling indicating a set of channel candidates for the feedback transmission; and select the at least one channel out of the indicated set of channel candidates for the feedback transmission. In some embodiments of this aspect, the processing circuitry is configured to transmit the feedback by being configured to transmit the feedback in the selected at least one channel.

In some embodiments of this aspect, the processing circuitry is configured to select the at least one channel out of the indicated set of channel candidates by being configured to cause the WD to select the at least one channel out of the indicated set of channel candidates for the feedback transmission based at least in part on at least one of: a predefined order; the at least one channel associated with a downlink transmission; the at least one channel associated with an uplink transmission; the at least one channel associated with a Listen-before-talk, LBT, category; the at least one channel in which an LBT procedure is not used; the at least one channel associated with a lowest serving cell index within a PUCCH group; the at least one channel having a shortest sensing duration within a PUCCH group; the at least one channel associated with at least one of a lowest channel occupancy and a lowest Listen-before-talk, LBT, failure statistic; and the at least one channel in which the WD received a downlink scheduling.

In some embodiments of this aspect, the processing circuitry is further configured to cause the WD to if the at least one PUCCH resource overlaps a physical uplink shared channel, PUSCH, transmission, multiplex the feedback with the PUSCH transmission. In some embodiments of this aspect, the processing circuitry is further configured to cause the WD to receive a downlink control information, DCI, the DCI indicating a timing for the feedback on the at least one PUCCH resource; receive an uplink, UL, grant on a physical uplink shared channel, PUSCH; and based at least in part on a Listen-before-talk, LBT, outcome, select one of the at least one PUCCH resource and the PUSCH to transmit the feedback. In some embodiments of this aspect, the feedback comprises at least one of uplink control information, UCI, Hybrid Automatic Repeat reQuest, HARQ, acknowledgement, ACK, a channel state information, CSI, and a scheduling request. In some embodiments of this aspect, the plurality of channels corresponds to one of a plurality of sub-bands in an unlicensed spectrum, a plurality of carriers, and a plurality of cells.

According to yet another aspect of the present disclosure, a network node configured to communicate with a wireless device, WD, is provided. The network node includes processing circuitry. The processing circuitry is configured to cause the network node to transmit a configuration for a plurality of channels, the configuration configuring each of the plurality of channels with at least one physical uplink control channel, PUCCH, resource; and receive feedback on the at least one PUCCH resource that is configured in at least one channel of the plurality of channels.

In some embodiments of this aspect, the at least one channel on which the feedback is received is based at least in part on a Listen-before-talk, LBT, category associated with the at least one channel. In some embodiments of this aspect, the processing circuitry is further configured to cause the network node to transmit a downlink control information, DCI, the LBT category being based on LBT information indicated in the DCI. In some embodiments of this aspect, the at least one channel on which the feedback is received corresponds to the at least one channel within a PUCCH group in which a Listen-before-talk, LBT, procedure is not used. In some embodiments of this aspect, the at least one channel on which the feedback is received is based at least in part on a lowest serving cell index within a PUCCH group. In some embodiments of this aspect, the at least one channel on which the feedback is received corresponds to the at least one channel having a shortest sensing duration within a PUCCH group.

In some embodiments of this aspect, the at least one channel on which the feedback is received corresponds to the at least one channel associated with at least one of a lowest channel occupancy and a lowest Listen-before-talk, LBT, failure statistic. In some embodiments of this aspect, the at least one channel on which the feedback is received is a same channel that the WD received a corresponding downlink scheduling to which the feedback is related. In some embodiments of this aspect, the processing circuitry is further configured to cause the network node to receive at least one duplicate of the feedback in at least one of: at least one channel of the plurality of channels within a PUCCH group; at least one channel for which the WD received a downlink scheduling; and at least one channel within a subset of the plurality of channels explicitly indicated by the network node. In some embodiments of this aspect, the configuration configures the WD with a plurality of PUCCH groups, each PUCCH group being assigned at least one of the plurality of channels.

In some embodiments of this aspect, the processing circuitry is further configured to cause the network node to transmit at least one downlink control information, DCI, comprising at least one index indicating the at least one channel to be used for the feedback transmission. In some embodiments of this aspect, the at least one DCI comprising the at least one index is duplicated in all downlink channels associated with the WD. In some embodiments of this aspect, the processing circuitry is further configured to cause the network node to transmit signaling indicating a set of channel candidates for the feedback transmission. The feedback is received in the at least one channel that is selected out of the indicated set of channel candidates.

In some embodiments of this aspect, the at least one channel that is selected out of the indicated set of channel candidates is selected based at least in part on at least one of: a predefined order; the at least one channel associated with a downlink transmission; the at least one channel associated with an uplink transmission; the at least one channel associated with a Listen-before-talk, LBT, category; the at least one channel in which an LBT procedure is not used; the at least one channel associated with a lowest serving cell index within a PUCCH group; the at least one channel having a shortest sensing duration within a PUCCH group; the at least one channel associated with at least one of a lowest channel occupancy and a lowest Listen-before-talk, LBT, failure statistic; and the at least one channel in which the WD received a downlink scheduling.

In some embodiments of this aspect, the processing circuitry is further configured to cause the network node to if the at least one PUCCH resource overlaps a physical uplink shared channel, PUSCH, transmission, receive the feedback as multiplexed with the PUSCH transmission. In some embodiments of this aspect, the processing circuitry is further configured to cause the network node to transmit a downlink control information, DCI, the DCI indicating a timing for the feedback on the at least one PUCCH resource; transmit an uplink, UL, grant on a physical uplink shared channel, PUSCH; and based at least in part on a Listen-before-talk, LBT, outcome of the WD, receive the feedback in one of the at least one PUCCH resource and the PUSCH. In some embodiments of this aspect, the feedback comprises at least one of uplink control information, UCI, Hybrid Automatic Repeat reQuest, HARQ, acknowledgement, ACK, a channel state information, CSI, and a scheduling request. In some embodiments of this aspect, the plurality of channels corresponds to one of a plurality of sub-bands in an unlicensed spectrum, a plurality of carriers, and a plurality of cells.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

FIG. 7 is a flowchart illustrating exemplary methods implemented in a communication system including a host computer, a network node and a wireless device for receiving user data from the wireless device at a host computer according to some embodiments of the present disclosure;

FIG. 8 is a flowchart illustrating exemplary methods implemented in a communication system including a host computer, a network node and a wireless device for receiving user data at a host computer according to some embodiments of the present disclosure;

DETAILED DESCRIPTION

Figure 1:
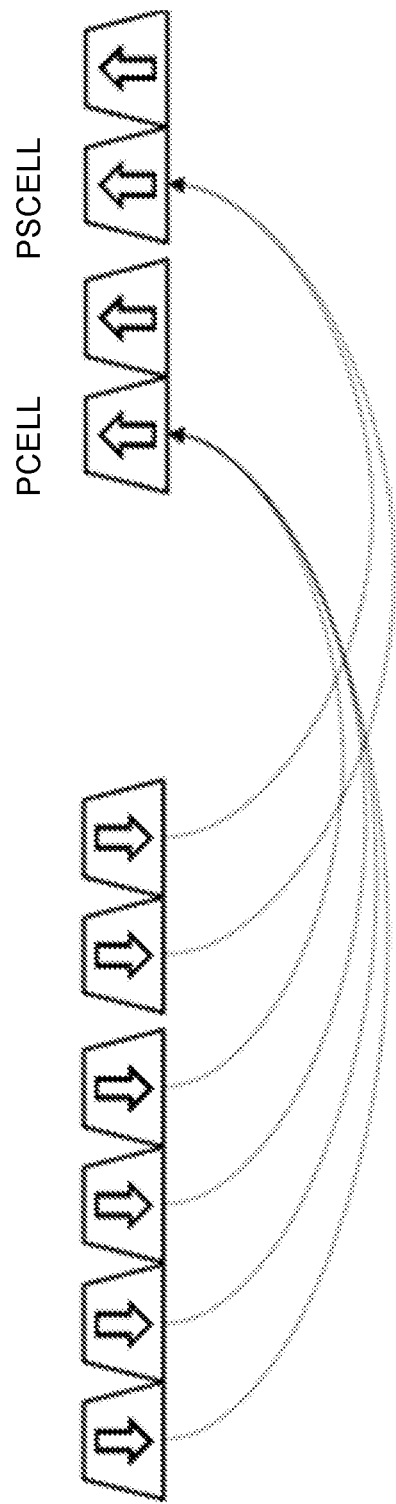
FIG. 1 illustrates the use of multiple PUCCH groups for NR, where PUCCH groups are transmitted on PCell and PSCell.
Figure 2:
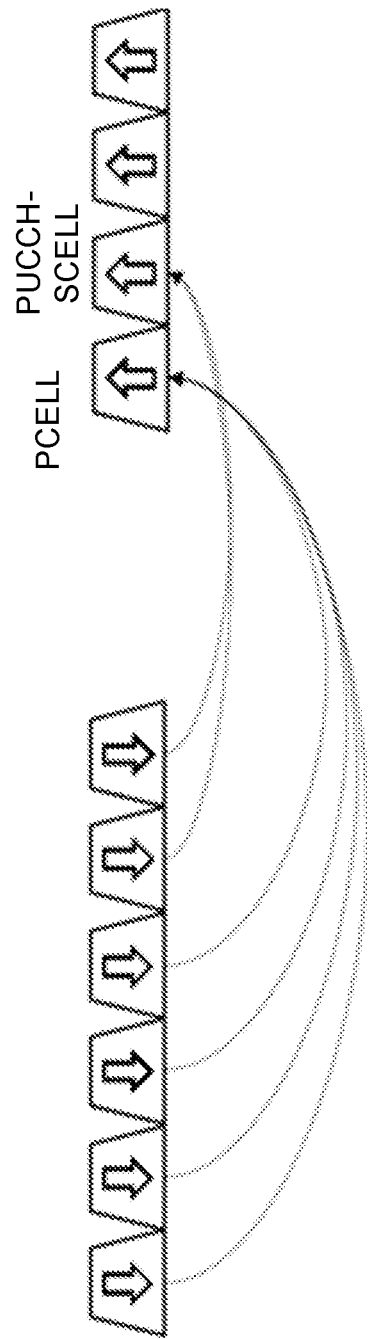
FIG. 2 is an example of the feedback mechanism with multiple PUCCH groups, in which the feedback for the first 4 downlink (DL) CCs may be transmitted in the uplink (UL) PCell and the feedback for the last 2 DL CCs may be transmitted in the UL PSCell.

As noted above, the cross-carriers feedback mechanism in 3GPP Rel-15 NR is designed for licensed operations, where the availability of the UL PCell and/or UL PSCell/PUCCH-SCell is certain. In NR-U however, UL PCell and/or PSCell/PUCCH-SCell are not always available. This disclosure provides a method and devices to transmit feedback information for multiple carriers which take into account the uncertainty of PCell/PSCell/PUCCH-SCell availability.

Before describing in detail exemplary embodiments, it is noted that the embodiments reside primarily in combinations of apparatus components and processing steps related to transmitting feedback information when operating in unlicensed portions of the radio frequency spectrum. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

Note that the term "carrier" and "cell" are used with similar meanings in the context of this disclosure. As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "channel" is used and may be used interchangeably with one or more of the terms "sub-bands", "cell" and/or "carrier" e.g., as different terminology may be used in different technology environments. For example, in Carrier Aggregation (CA), the term "carrier" may be used, while in Dual Connectivity (DC), the term "cell" may be used.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
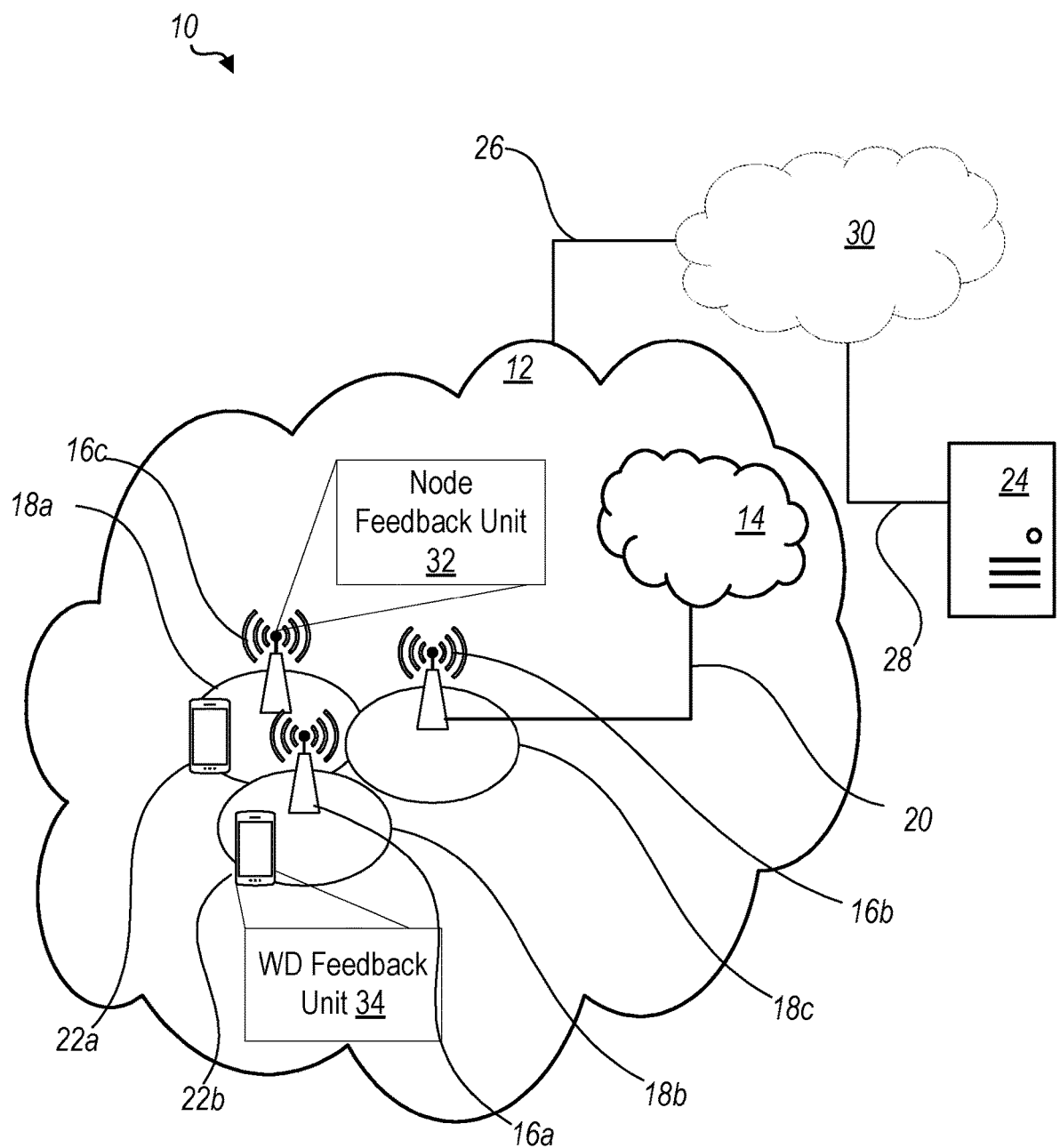
FIG. 3 is a schematic diagram of an exemplary network architecture illustrating a communication system connected via an intermediate network to a host computer according to the principles in the present disclosure.

Embodiments provide flexibility for HARQ-ACK feedback transmission for unlicensed spectrum operation. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a node feedback unit 32 which is configured to cause the network node 16 to transmit a configuration for a plurality of channels, the configuration configuring each of the plurality of channels with at least one physical uplink control channel, PUCCH, resource; and receive feedback on the at least one PUCCH resource that is configured in at least one channel of the plurality of channels. In some embodiments, network node 16 is configured to include a node feedback unit 32 which is configured to cause the network node 16 to provide flexibility for HARQ-ACK feedback transmission for unlicensed spectrum operation. A WD 22 is configured to include a WD feedback unit 34 which is configured to cause the WD 22 to receive a configuration for a plurality of channels, the configuration configuring each of the plurality of channels with at least one physical uplink control channel, PUCCH, resource; and transmit feedback on the at least one PUCCH resource that is configured in at least one channel of the plurality of channels. In some embodiments, the WD 22 is configured to include a WD feedback unit 34 which is configured to cause the WD 22 to provide feedback to the network node 16 in accordance with a feedback transmission scheme.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the WD 22. The processing circuitry 42 of the host computer 24 may include a control unit 54 configured to enable the service provider to control the network node 16 and or the WD 22. The processing circuitry 42 of the host computer 24 may also include a monitoring unit 56 configured to enable the service provider to monitor the network node 16 and or the WD 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node feedback unit 32 configured to provide flexibility for HARQ-ACK feedback transmission for unlicensed spectrum operation.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the WD 22 may include a WD feedback unit 34 configured to provide feedback to the network node 16 in accordance with a feedback transmission scheme.

Figure 4:
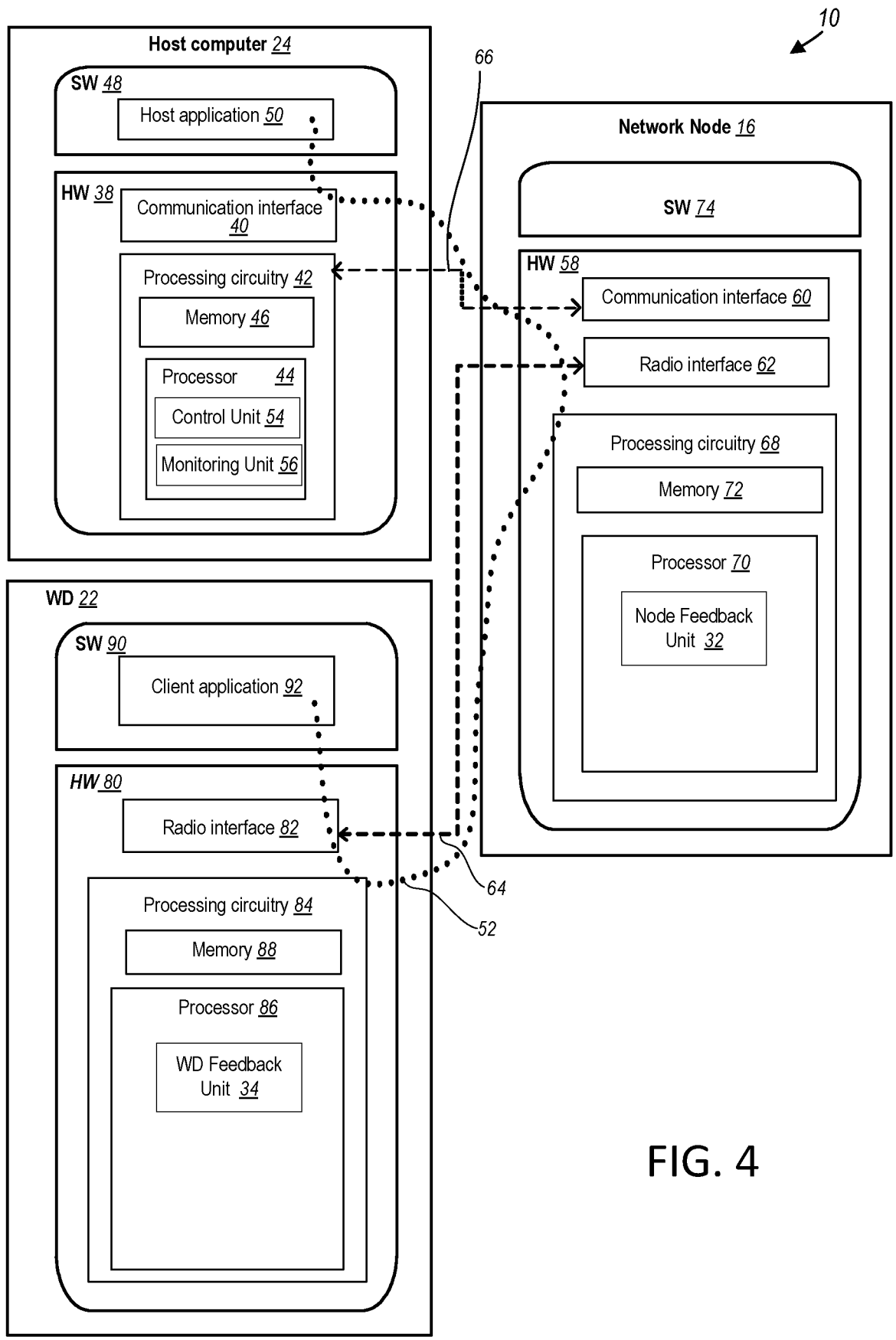
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the WD 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as node feedback unit 32, and WD feedback unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
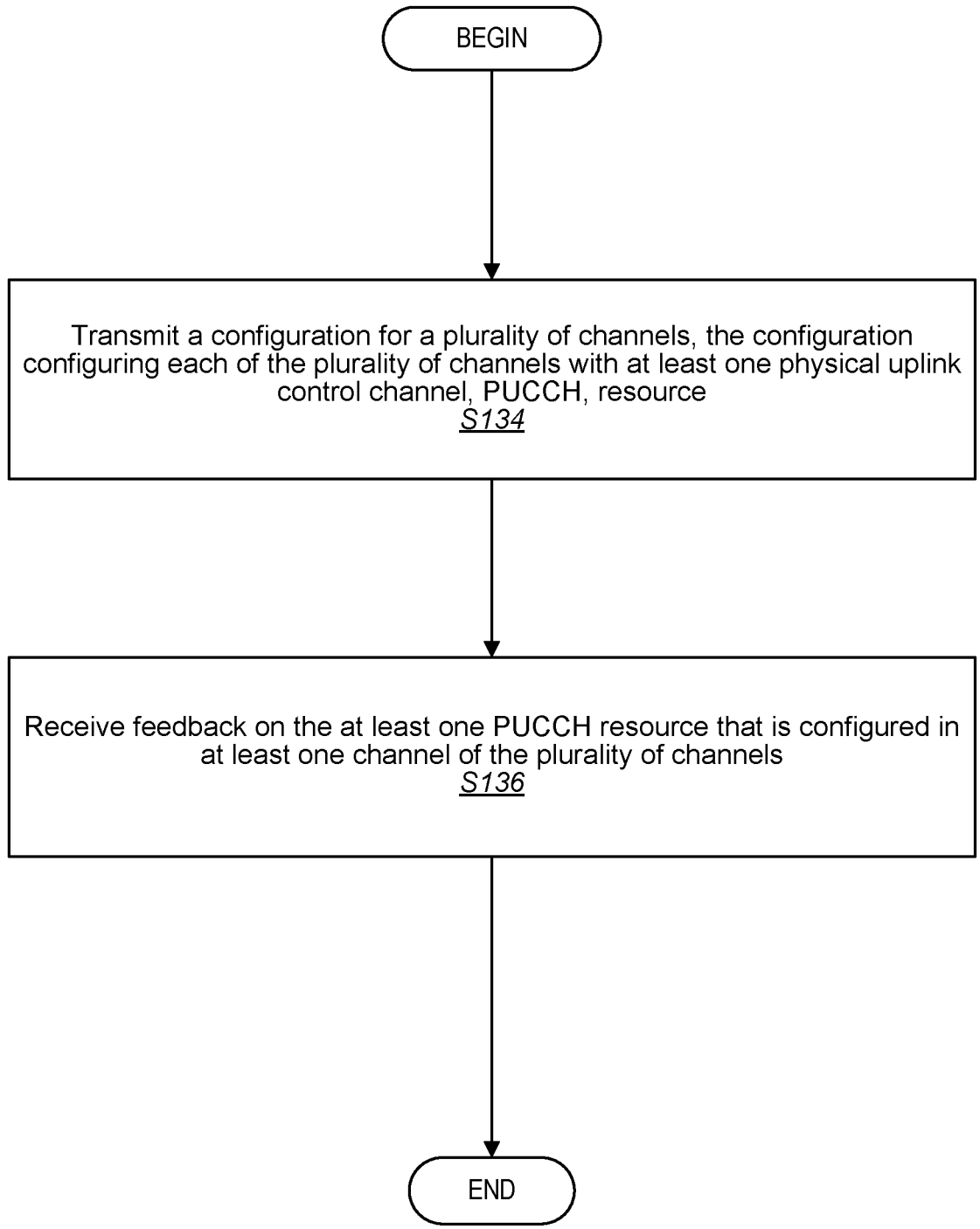
FIG. 9 is a flowchart of an exemplary process in a network node for providing flexibility for HARQ-ACK feedback transmission for unlicensed spectrum operation according to some embodiments of the present disclosure.

FIG. 9 is a flowchart of an exemplary process in a network node 16 for providing flexibility for HARQ-ACK feedback transmission for unlicensed spectrum operation according to some embodiments of the present disclosure. One or more Blocks and/or functions performed by network node 16 may be performed by one or more elements of network node 16 such as by node feedback unit 32 in processing circuitry 68, processor 70, communication interface 60, radio interface 62, etc.

In one or more embodiments, the network node 16 such as via one or more of processing circuitry 68, processor 70, radio interface 62 and communication interface 60 is configured to transmit (Block S134) a configuration for a plurality of channels, the configuration configuring each of the plurality of channels with at least one physical uplink control channel, PUCCH, resource. The network node 16 such as via one or more of processing circuitry 68, processor 70, radio interface 62 and communication interface 60 is configured to receive (Block S136) feedback on the at least one PUCCH resource that is configured in at least one channel of the plurality of channels.

In some embodiments, the at least one channel on which the feedback is received is based at least in part on a Listen-before-talk, LBT, category associated with the at least one channel. In some embodiments, the network node 16 such as via one or more of processing circuitry 68, processor 70, radio interface 62 and communication interface 60 is configured to cause the network node 16 to is further configured to cause the network node 16 to transmit a downlink control information, DCI, the LBT category being based on LBT information indicated in the DCI. In some embodiments, the at least one channel on which the feedback is received corresponds to the at least one channel within a PUCCH group in which a Listen-before-talk, LBT, procedure is not used.

In some embodiments, the at least one channel on which the feedback is received is based at least in part on a lowest serving cell index within a PUCCH group. In some embodiments, the at least one channel on which the feedback is received corresponds to the at least one channel having a shortest sensing duration within a PUCCH group. In some embodiments, the at least one channel on which the feedback is received corresponds to the at least one channel associated with at least one of a lowest channel occupancy and a lowest Listen-before-talk, LBT, failure statistic. In some embodiments, the at least one channel on which the feedback is received is a same channel that the WD 22 received a corresponding downlink scheduling to which the feedback is related. In some embodiments, the network node 16 such as via one or more of processing circuitry 68, processor 70, radio interface 62 and communication interface 60 is configured to receive at least one duplicate of the feedback in at least one of: at least one channel of the plurality of channels within a PUCCH group; at least one channel for which the WD 22 received a downlink scheduling; and at least one channel within a subset of the plurality of channels explicitly indicated by the network node 16.

In some embodiments, the configuration configures the WD 22 with a plurality of PUCCH groups, each PUCCH group being assigned at least one of the plurality of channels. In some embodiments, the processing circuitry 68 is further configured to cause the network node 16 to transmit, via radio interface 62, at least one downlink control information, DCI, comprising at least one index indicating the at least one channel to be used for the feedback transmission. In some embodiments, the at least one DCI comprising the at least one index is duplicated in all downlink channels associated with the WD 22. In some embodiments, the processing circuitry 68 is further configured to cause the network node 16 to transmit signaling indicating a set of channel candidates for the feedback transmission; and wherein the feedback is received in the at least one channel that is selected out of the indicated set of channel candidates.

In some embodiments, the at least one channel that is selected out of the indicated set of channel candidates is selected based at least in part on at least one of: a predefined order; the at least one channel associated with a downlink transmission; the at least one channel associated with an uplink transmission; the at least one channel associated with a Listen-before-talk, LBT, category; the at least one channel in which an LBT procedure is not used; the at least one channel associated with a lowest serving cell index within a PUCCH group; the at least one channel having a shortest sensing duration within a PUCCH group; the at least one channel associated with at least one of a lowest channel occupancy and a lowest Listen-before-talk, LBT, failure statistic; and the at least one channel in which the WD 22 received a downlink scheduling.

In some embodiments, the processing circuitry 68 is further configured to cause the network node 16 to if the at least one PUCCH resource overlaps a physical uplink shared channel, PUSCH, transmission, receive the feedback as multiplexed with the PUSCH transmission. In some embodiments, the processing circuitry 68 is further configured to cause the network node 16 to transmit, via radio interface 62, a downlink control information, DCI, the DCI indicating a timing for the feedback on the at least one PUCCH resource; transmit, via radio interface 62, an uplink, UL, grant on a physical uplink shared channel, PUSCH; and based at least in part on a Listen-before-talk, LBT, outcome of the WD 22, receive, via radio interface 62, the feedback in one of the at least one PUCCH resource and the PUSCH. In some embodiments, the feedback comprises at least one of uplink control information, UCI, Hybrid Automatic Repeat reQuest, HARQ, acknowledgement, ACK, a channel state information, CSI, and a scheduling request. In some embodiments, the plurality of channels corresponds to one of a plurality of sub-bands in an unlicensed spectrum, a plurality of carriers, and a plurality of cells.

In some embodiments, the network node 16 such as via one or more of processing circuitry 68, processor 70, radio interface 62 and communication interface 60 is configured to determine if at least one of an uplink (UL) primary cell (PCell), a primary secondary (PSCell) and a physical uplink control channel (PUCCH) secondary cell are available for receiving feedback information from a wireless device (WD) 22. If at least one of the uplink (UL) primary cell (PCell), the primary secondary (PSCell) and the physical uplink control channel (PUCCH) secondary cell are not available for receiving feedback information from the WD, an UL PUCCH is configured for the WD 22 to transmit the feedback information without using the unavailable uplink (UL) primary cell (PCell), the primary secondary (PSCell) and the physical uplink control channel (PUCCH) secondary cell.

In one or more embodiments, network node 16 such as via one or more of processing circuitry 68, processor 70, radio interface 62 and communication interface 60 is configured to configure the WD 22 with multiple physical uplink control channel (PUCCH) groups, assign each PUCCH group one or more PUCCH-secondary cells (SCells) and use the assigned PUCCH-SCells to transmit the feedback information.

In one or more embodiments, network node 16 such as via one or more of processing circuitry 68, processor 70, radio interface 62 and communication interface 60 is configured to confine PUCCH transmission within a sub-band or configure a PUCCH resource across multiple sub-bands and signal the WD 22 to transmit the feedback information on a PUCCH resource of at least a subset of the multiple sub-bands.

In one or more embodiments, network node 16 such as via one or more of processing circuitry 68, processor 70, radio interface 62 and communication interface 60 is configured to radio resource control (RRC) configure a PUCCH resource in an uplink (UL) carrier and use the PUCCH resource to transmit the feedback information.

In one or more embodiments, network node 16 such as via one or more of processing circuitry 68, processor 70, radio interface 62 and communication interface 60 is configured to, based on a downlink control information (DCI) indication, configure the WD 22 to transmit physical uplink scheduling (PUSCH) without uplink (UL) scheduling (SCH) that carries hybrid automatic repeat request (HARQ) acknowledgement (ACK) uplink control information (UCI) and channel state information (CSI) and use at least one of the UCI and CSI to transmit the feedback information.

In one or more embodiments, network node 16 such as via one or more of processing circuitry 68, processor 70, radio interface 62 and communication interface 60 is configured to transmit downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and use the corresponding DL HARQ A/N in PUCCH to transmit the feedback information.

In one or more embodiments, network node 16 such as via one or more of processing circuitry 68, processor 70, radio interface 62 and communication interface 60 is configured to configure the WD 22 with multiple PUCCH-Cells within a PUCCH group and to transmit the feedback information on only one PUCCH-Cell per PUCCH group in a slot.

In one or more embodiments, network node 16 such as via one or more of processing circuitry 68, processor 70, radio interface 62 and communication interface 60 is configured to configure the WD 22 with multiple PUCCH-Cells within a group and to duplicate the feedback information on at least one of all of the PUCCH-Cells within a PUCCH group; PUCCH-Cells in which the WD 22 received DL scheduling; and a subset of PUCCH-Cells indicated by the network node 16.

In one or more embodiments, network node 16 such as via one or more of processing circuitry 68, processor 70, radio interface 62 and communication interface 60 is configured to configure at least one of a PUCCH configuration and a PUCCH-scheduling request (SR) configuration across at least one of multiple PUCCH-cells and multiple listen before talk (LBT) subbands and configure the WD 22 to use the configured at least one of a PUCCH configuration and a PUCCH-SR configuration to transmit the feedback information.

Figure 10:
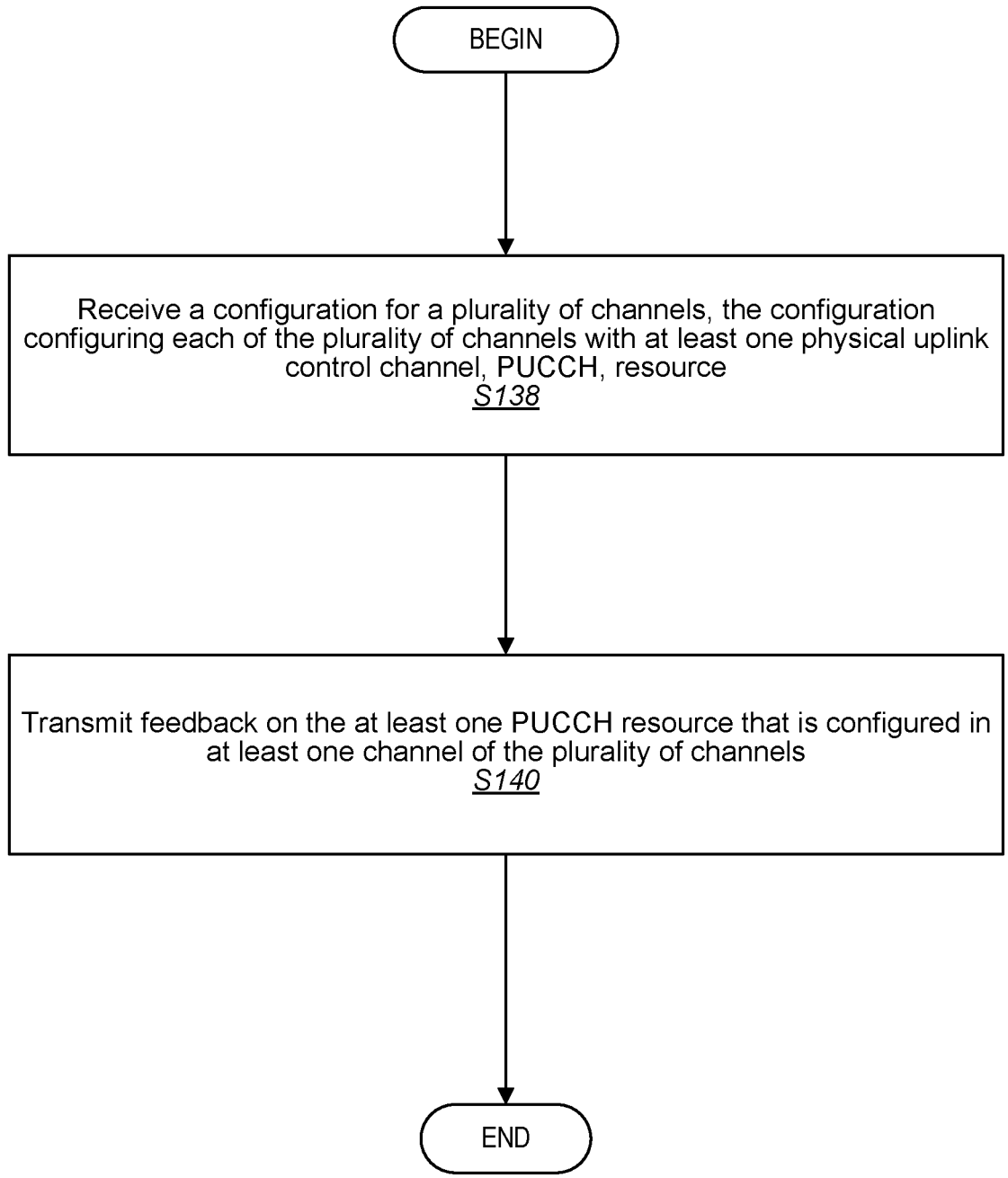
FIG. 10 is a flowchart of an exemplary process in a wireless device for providing flexibility for HARQ-ACK feedback transmission for unlicensed spectrum operation according to some embodiments of the present disclosure.

FIG. 10 is a flowchart of an exemplary process in a WD 22 for providing flexibility for HARQ-ACK feedback transmission for unlicensed spectrum operation according to some embodiments of the present disclosure. One or more Blocks and/or functions performed by WD 22 may be performed by one or more elements of WD 22 such as by WD 22 feedback unit 34 in processing circuitry 84, processor 86, radio interface 82, etc.

In one or more embodiments, the WD 22 such as via one or more of processing circuitry 84, processor 86 and radio interface 82 is configured to receive (Block S138) a configuration for a plurality of channels, the configuration configuring each of the plurality of channels with at least one physical uplink control channel, PUCCH, resource. The WD 22 such as via one or more of processing circuitry 84, processor 86 and radio interface 82 is configured to transmit (Block S140) feedback on the at least one PUCCH resource that is configured in at least one channel of the plurality of channels.

In some embodiments, the at least one channel on which the feedback is transmitted is based at least in part on a Listen-before-talk, LBT, category associated with the at least one channel. In some embodiments, the processing circuitry 84 is further configured to cause the WD 22 to receive, via radio interface 82, a downlink control information, DCI, the LBT category being based on LBT information indicated in the DCI. In some embodiments, the at least one channel on which the feedback is transmitted corresponds to the at least one channel within a PUCCH group in which a Listen-before-talk, LBT, procedure is not used. In some embodiments, the at least one channel on which the feedback is transmitted is based at least in part on a lowest serving cell index within a PUCCH group. In some embodiments, the at least one channel on which the feedback is transmitted corresponds to the at least one channel having a shortest sensing duration within a PUCCH group.

In some embodiments, the at least one channel on which the feedback is transmitted corresponds to the at least one channel associated with at least one of a lowest channel occupancy and a lowest Listen-before-talk, LBT, failure statistic. In some embodiments, the at least one channel on which the feedback is transmitted is a same channel that the WD 22 received a corresponding downlink scheduling to which the feedback is related. In some embodiments, WD 22 such as via one or more of processing circuitry 84, processor 86 and radio interface 82 is configured to transmit at least one duplicate of the feedback for at least one of: all the channels of the plurality of channels within a PUCCH group; channels for which the WD received a downlink scheduling; and a subset of the plurality of channels explicitly indicated by the network node.

In some embodiments, the received configuration configures the WD 22 with a plurality of PUCCH groups, each PUCCH group being assigned at least one of the plurality of channels. In some embodiments, the WD 22 such as via one or more of processing circuitry 84, processor 86 and radio interface 82 is further configured to receive at least one downlink control information, DCI, comprising at least one index indicating the at least one channel to be used for the feedback transmission. In some embodiments, the at least one DCI comprising the at least one index received by the WD 22 is duplicated in all downlink channels associated with the WD 22. In some embodiments, the WD 22 such as via one or more of processing circuitry 84, processor 86 and radio interface 82 is configured to receive signaling indicating a set of channel candidates for the feedback transmission; and select the at least one channel out of the indicated set of channel candidates for the feedback transmission. In some embodiments, the WD 22 such as via one or more of processing circuitry 84, processor 86 and radio interface 82 is configured to transmit the feedback by being configured to transmit the feedback in the selected at least one channel.

In some embodiments, the WD 22 such as via one or more of processing circuitry 84, processor 86 and radio interface 82 is configured to select the at least one channel out of the indicated set of channel candidates by being configured to cause the WD 22 to: select the at least one channel out of the indicated set of channel candidates for the feedback transmission based at least in part on at least one of: a predefined order; the at least one channel associated with a downlink transmission; the at least one channel associated with an uplink transmission; the at least one channel associated with a Listen-before-talk, LBT, category; the at least one channel in which an LBT procedure is not used; the at least one channel associated with a lowest serving cell index within a PUCCH group; the at least one channel having a shortest sensing duration within a PUCCH group; the at least one channel associated with at least one of a lowest channel occupancy and a lowest Listen-before-talk, LBT, failure statistic; and the at least one channel in which the WD 22 received a downlink scheduling.

In some embodiments, the WD 22 such as via one or more of processing circuitry 84, processor 86 and radio interface 82 is configured to if the at least one PUCCH resource overlaps a physical uplink shared channel, PUSCH, transmission, multiplex the feedback with the PUSCH transmission. In some embodiments, the WD 22 such as via one or more of processing circuitry 84, processor 86 and radio interface 82 is configured to receive a downlink control information, DCI, the DCI indicating a timing for the feedback on the at least one PUCCH resource; receive an uplink, UL, grant on a physical uplink shared channel, PUSCH; and based at least in part on a Listen-before-talk, LBT, outcome, select one of the at least one PUCCH resource and the PUSCH to transmit the feedback.

In some embodiments, the feedback comprises at least one of uplink control information, UCI, Hybrid Automatic Repeat reQuest, HARQ, acknowledgement, ACK, a channel state information, CSI, and a scheduling request. In some embodiments, the plurality of channels corresponds to one of a plurality of sub-bands in an unlicensed spectrum, a plurality of carriers, and a plurality of cells.

In one or more embodiments, WD 22 such as via one or more of processing circuitry 84, processor 86 and radio interface 82 is configured to determine if at least one of an uplink (UL) primary cell (PCell), a primary secondary (PSCell) and a physical uplink control channel (PUCCH) secondary cell are available for transmitting feedback information to the network node. If at least one of the uplink (UL) primary cell (PCell), the primary secondary (PSCell) and the physical uplink control channel (PUCCH) secondary cell are not available for transmitting feedback information to the network node, WD 22 is configured, e.g., by the network node 16, to use an UL PUCCH to transmit the feedback information without using the unavailable uplink (UL) primary cell (PCell), the primary secondary (PSCell) and the physical uplink control channel (PUCCH) secondary cell In one or more embodiments, WD 22 such as via one or more of processing circuitry 84, processor 86 and radio interface 82 is configured to use one or more PUCCH-SCells assigned to a PUCCH group to transmit the feedback information.

In one or more embodiments, WD 22 such as via one or more of processing circuitry 84, processor 86 and radio interface 82 is configured to confine PUCCH transmission within a sub-band or a subset of multiple sub-bands.

In one or more embodiments, WD 22 such as via one or more of processing circuitry 84, processor 86 and radio interface 82 is configured to use (Block S148) a radio resource control (RRC) configured PUCCH resource in an uplink (UL) carrier to transmit the feedback information.

In one or more embodiments, WD 22 such as via one or more of processing circuitry 84, processor 86 and radio interface 82 is configured to transmit physical uplink scheduling (PUSCH) without uplink (UL) scheduling (SCH) that carries hybrid automatic repeat request (HARQ) acknowledgement (ACK) uplink control information (UCI) and channel state information (CSI) and use at least one of the UCI and CSI to transmit the feedback information.

In one or more embodiments, WD 22 such as via one or more of processing circuitry 84, processor 86 and radio interface 82 is configured to receive (Block S152) downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and use the corresponding DL HARQ A/N in PUCCH to transmit the feedback information.

In one or more embodiments, WD 22 such as via one or more of processing circuitry 84, processor 86 and radio interface 82 is configured to transmit the feedback information on only one PUCCH-Cell per PUCCH group in a slot.

In one or more embodiments, WD 22 such as via one or more of processing circuitry 84, processor 86 and radio interface 82 is configured to duplicate the feedback information on at least one of all of the PUCCH-Cells within a PUCCH group; PUCCH-Cells in which the WD 22 received DL scheduling; and a subset of PUCCH-Cells indicated by the network node 16.

In one or more embodiments, WD 22 such as via one or more of processing circuitry 84, processor 86 and radio interface 82 is configured to use at least one of a PUCCH configuration and a PUCCH-SR configuration to transmit the feedback information.

Figure 11:
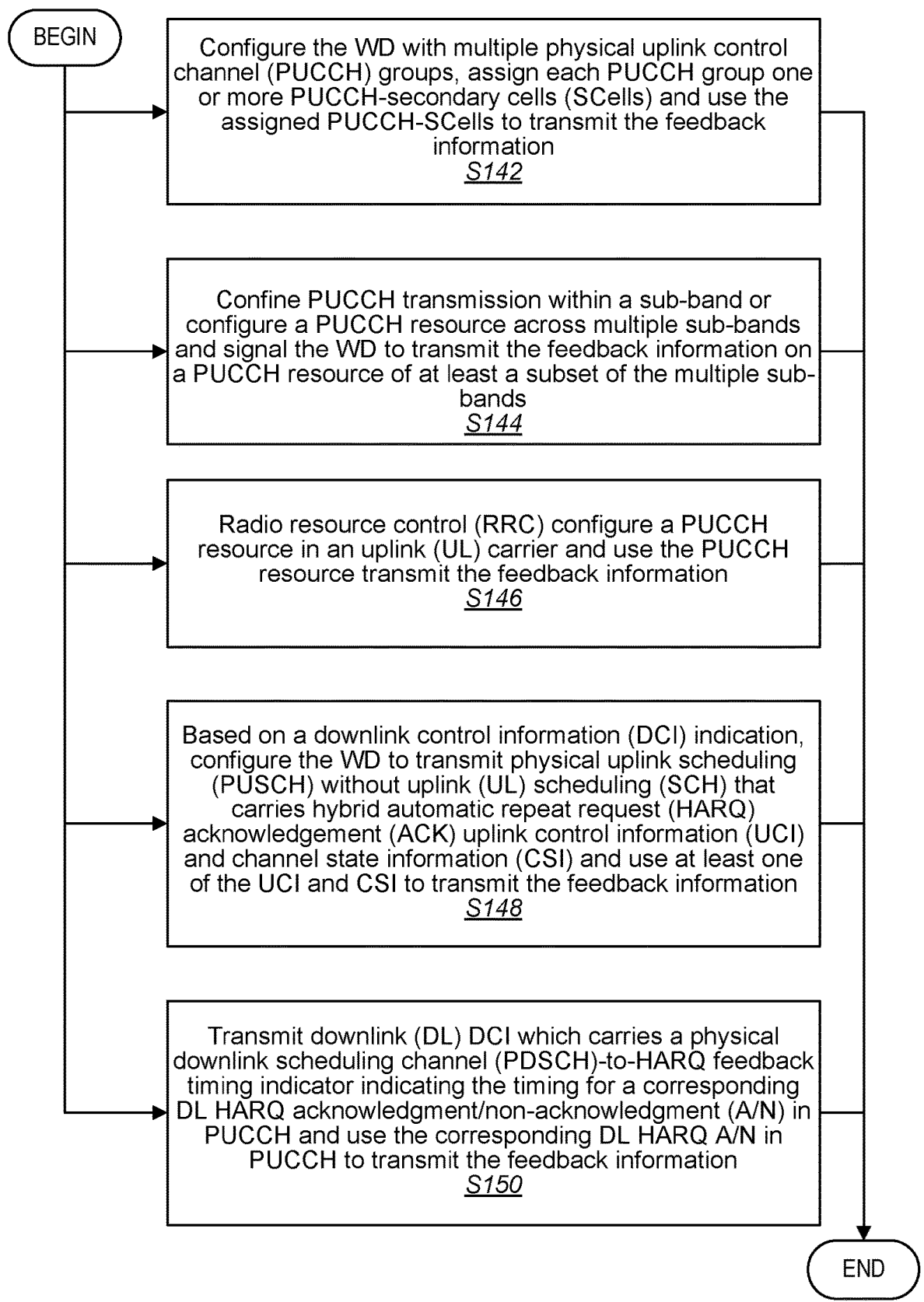
FIG. 11 is a flowchart of exemplary processes in a network node for providing flexibility for HARQ-ACK feedback transmission for unlicensed spectrum operation according to some embodiments of the present disclosure.

FIG. 11 is a flowchart of another exemplary processes in a network node 16 for providing flexibility for HARQ-ACK feedback transmission for unlicensed spectrum operation according to some embodiments of the present disclosure. One or more Blocks and/or functions performed by network node 16 may be performed by one or more elements of network node 16 such as by node feedback unit 32 in processing circuitry 68, processor 70, communication interface 60, radio interface 62, etc.

In one exemplary process in accordance with an embodiment, network node 16 such as via one or more of processing circuitry 68, processor 70, radio interface 62 and communication interface 60 is configured to configure (Block S142) the WD 22 with multiple physical uplink control channel (PUCCH) groups, assign each PUCCH group one or more PUCCH-secondary cells (SCells) and use the assigned PUCCH-SCells to transmit the feedback information.

In another exemplary process in accordance with an embodiment, network node 16 such as via one or more of processing circuitry 68, processor 70, radio interface 62 and communication interface 60 is configured to confine (Block S144) PUCCH transmission within a sub-band or configure a PUCCH resource across multiple sub-bands and signal the WD 22 to transmit the feedback information on a PUCCH resource of at least a subset of the multiple sub-bands.

In another exemplary process in accordance with an embodiment, network node 16 such as via one or more of processing circuitry 68, processor 70, radio interface 62 and communication interface 60 is configured to radio resource control (RRC) configure (Block S146) a PUCCH resource in an uplink (UL) carrier and use the PUCCH resource transmit the feedback information.

In another exemplary process in accordance with an embodiment, network node 16 such as via one or more of processing circuitry 68, processor 70, radio interface 62 and communication interface 60 is configured to based (Block S148) on a downlink control information (DCI) indication, configure the WD 22 to transmit physical uplink scheduling (PUSCH) without uplink (UL) scheduling (SCH) that carries hybrid automatic repeat request (HARQ) acknowledgement (ACK) uplink control information (UCI) and channel state information (CSI) and use at least one of the UCI and CSI to transmit the feedback information.

In another exemplary process in accordance with an embodiment, network node 16 such as via one or more of processing circuitry 68, processor 70, radio interface 62 and communication interface 60 is configured to transmit (Block S150) downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and use the corresponding DL HARQ A/N in PUCCH to transmit the feedback information.

Figure 12:
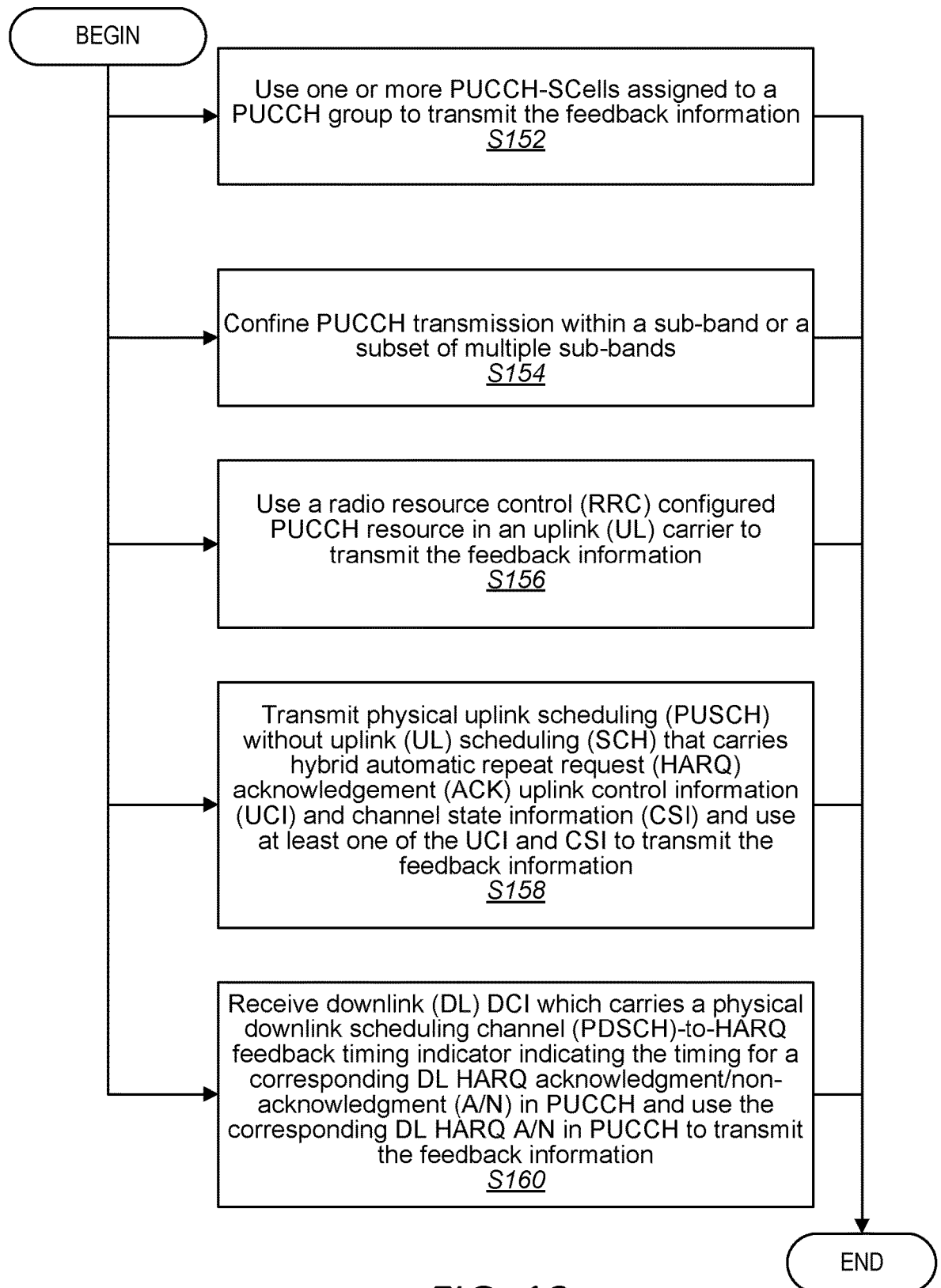
FIG. 12 is a flowchart of exemplary processes in a wireless device for providing flexibility for HARQ-ACK feedback transmission for unlicensed spectrum operation according to some embodiments of the present disclosure.

FIG. 12 is a flowchart of exemplary processes in a WD 22 for providing flexibility for HARQ-ACK feedback transmission for unlicensed spectrum operation according to some embodiments of the present disclosure. One or more Blocks and/or functions performed by WD 22 may be performed by one or more elements of WD 22 such as by WD 22 feedback unit 34 in processing circuitry 84, processor 86, radio interface 82, etc.

In one exemplary process in accordance with an embodiment, WD 22 such as via one or more of processing circuitry 84, processor 86 and radio interface 82 is configured to use (Block S152) one or more PUCCH-SCells assigned to a PUCCH group to transmit the feedback information.

In another exemplary process in accordance with an embodiment, WD 22 such as via one or more of processing circuitry 84, processor 86 and radio interface 82 is configured to confine (Block S154) PUCCH transmission within a sub-band or a subset of multiple sub-bands.

In another exemplary process in accordance with an embodiment, WD 22 such as via one or more of processing circuitry 84, processor 86 and radio interface 82 is configured to use (Block S156) a radio resource control (RRC) configured PUCCH resource in an uplink (UL) carrier to transmit the feedback information.

In another exemplary process in accordance with an embodiment, WD 22 such as via one or more of processing circuitry 84, processor 86 and radio interface 82 is configured to transmit (Block S158) physical uplink scheduling (PUSCH) without uplink (UL) scheduling (SCH) that carries hybrid automatic repeat request (HARQ) acknowledgement (ACK) uplink control information (UCI) and channel state information (CSI) and use at least one of the UCI and CSI to transmit the feedback information.

In another exemplary process in accordance with an embodiment, WD 22 such as via one or more of processing circuitry 84, processor 86 and radio interface 82 is configured to receive (Block S160) downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and use the corresponding DL HARQ A/N in PUCCH to transmit the feedback information.

Having described the general process flow of arrangements of the disclosure and having provided examples of hardware and software arrangements for implementing the processes and functions of the disclosure, the sections below provide details and examples of arrangements for HARQ-ACK feedback transmission that is needed for unlicensed operation.

Embodiment 1: Carrier Aggregation

The WD 22 may be configured with multiple PUCCH groups. Each group is assigned one or more PUCCH-SCells in which to transmit PUCCH information.

In another embodiment, the WD 22 may be configured with multiple PUCCH groups and each group has one SCell configured as a PUCCH-Cell. The WD 22 may be configured and signaled to transmit PUCCH information in certain PUCCH resources in the same carrier that the WD 22 received DL scheduling.

Embodiment #1a

In another embodiment, the WD 22 may be configured with multiple PUCCH-Cells within a group. However, the WD 22 is expected to transmit PUCCH information on only one PUCCH-Cell per PUCCH group in a slot.

The WD 22 may select the PUCCH cell for a PUCCH transmission based listen before talk (LBT) category for the UL transmissions. The WD 22 may derive this information from the LBT information indicated in the DCI. The WD 22 may follow one or more of the following steps.

PUCCH is sent on a PUCCH Cell within a PUCCH group in which no LBT is needed. If multiple of those exist, the WD 22 may send PUCCH on the cell with the lowest ServCellIndex within the PUCCH group.

Otherwise, if none of the configured PUCCH Cells within the PUCCH group can be accessed with no LBT, the WD 22 PUCCH is sent on the PUCCH Cell in which a user equipment category 2 device with the shortest sensing duration is indicated. If multiple of those exist, the WD 22 sends PUCCH on the cell with the lowest ServCellIndex within the PUCCH group. Otherwise, the WD 22 sends PUCCH on the cell within the PUCCH group with the lowest ServCellIndex within the PUCCH group.

As another option for any above step, the WD 22 may send PUCCH on the cell with the lowest channel occupancy or lowest LBT failure statistics among the specific set of PUCCH SCells.

Embodiment #1b

The WD 22 may be configured with multiple PUCCH-Cells within a group. The WD 22 duplicates the PUCCH information on: all of the PUCCH-Cells within a PUCCH group; or on the PUCCH Cells in which WD 22 received DL scheduling; or on a subset of PUCCH Cells explicitly indicated by the network node 16.

As another option, the duplication of PUCCH information may only be configured for a specific traffic type; logical channel (LCH); logical channel group (LCG); and/or specific uplink control information (UCI) information type. In the case where the PUCCH SR message is duplicated, the duplication of the PUCCH SR may be only configured for a specific PUCCH-SR configuration.

In a case where the network node 16 has received at least one copy of the PUCCH information, the network node 16 may discard the other copies of the same PUCCH information. As an option, the two PUCCH information transmissions for the same cell/BWP/set of hybrid automatic repeat request (HARQ) processes may be treated as the two duplicates if they are received within a configured time period.

Embodiment #2: Wideband

In what follows, a "sub-band" may be understood equivalently as a "listen before talk (LBT) sub-band" or "LBT bandwidth". The PUCCH transmission is confined within a sub-band either by:
 a) PUCCH configuration is per sub-band;
 b) PUCCH resources within one configuration do not cross more than one sub-band;
 c) PUCCH configuration comprises multiple PUCCH resources belonging to multiple sub-bands; and/or
 d) PUCCH resources are configured across multiple sub-bands.

However, WD 22 may be signaled (implicitly, e.g., based on DL sub-band transmissions or explicitly, e.g., based on sub-band indicator or acknowledgement resource indicator (ARI) in DCI) to transmit feedback on PUCCH resources of certain sub-bands.

In an embodiment, the WD 22 may be configured with multiple sub-band PUCCH groups. Each group is configured/indicated by one or more sub-band PUCCH. In an embodiment, the WD 22 may be configured/signaled to transmit sub-band PUCCH group information in certain PUCCH resource(s) in pre-defined sub-band(s) for a given group of sub-bands. In an embodiment, the WD 22 may be configured/signaled to transmit PUCCH information in certain PUCCH resource(s) in same sub-band that WD 22 received DL scheduling.

Embodiments 1a and 1b described above are also applicable to the above discussed embodiments. The proposed method can be applied to a case with single wideband carrier transmission in which the context of "carrier/cell" can be replaced by "sub-band" or "LBT sub-band".

Embodiment #3

In some embodiments, the PUCCH resource sets are radio resource control (RRC) configured in some or all of the UL carriers (instead of only in the PCell (primary carrier), PSCell (primary second carrier), and PUCCH-SCell as in Rel-15 NR).

If more than one PUCCH cell is configured by e.g., network node 16, the downlink control information (DCI) may indicate the index of the carrier or carriers that should be used for the PUCCH transmission.

The PUCCH cell index, or indices, indicated in the DCI may support an indication of "carrier selection for PUCCH transmission is pending". The exact PUCCH-cell index, or indices, may be indicated using another DCI that comes in the same or later slot.

A similar arrangement may be applicable for wideband operation. In such cases, the sub-band index may be indicated using a new field. Alternatively, the network node 16 may signal one of the resource Id in the DCI or the pending indication in PUCCH resource indication (PRI).

In another aspect of this embodiment, the network node 16 may overwrite the indicated carrier/sub-band with a different one using a later DCI.

Embodiment #3b

In an embodiment, if more than one carrier is used for DL transmissions, the carrier index for PUCCH transmissions may be signaled in duplicate in all DL carriers.

The network node 16 may signal a set of carrier candidates for PUCCH transmissions. Then, the WD 22 may select one of the carriers according to a predefined order, so that the selected carrier is known to the network node 16. For instance, the set of carrier candidates could be the carriers that: the network node 16 plans to transmit DL on; that are configured for UL transmissions; or that have PUCCH resources (optional). The predefined order may be according to Embodiment 1a with the condition that the carrier to be selected has to be in the candidate list or the carrier to be selected has to be the one received DL transmission.

By signaling a set of carrier candidates, the network node 16 may prepare the DCI in advance before LBT and the WD 22 can also select a PUCCH carrier that is known by the network node 16.

Embodiment #3c

In some embodiments, a single PUCCH configuration/ PUCCH-scheduling request (SR) configuration may be configured across multiple PUCCH-Cells (CA) and/or across multiple LBT-subbands. In these cases, the maximum number of PUCCH resources or PUCCH-SR resources within a configuration may need to be extended. In such a case, the PUCCH resource index in the DCI may be extended accordingly. If the PUCCH resources in each sub-band are similar with the others, the PUCCH resource indices can be defined per sub-band. Then, the sub-band index can be included to the DCI to indicate which PUCCH resource to transmit together with the PUCCH resource index.

Embodiment #4

In some embodiments, the WD 22 may be expected to transmit the physical uplink scheduling channel (PUSCH) without uplink scheduling (UL-SCH) that carries HARQ-acknowledgement (ACK) UCI and without channel status information (CSI) if the DCI indicates an UL-SCH indicator of "0"; or a CSI request of all zero(s) or non-zero CSI request field, but the triggered CSI report configuration indicates that no report is required.

In 3GPP Technical Specification (TS) 38.331, the information element (IE) CSI-ReportConfig contains a parameter "reportQuantity" which can be configured as "none". This applies, for example, to CSI-RS for tracking (TRS) where the CSI request field is non-zero, but there is no associated CSI report DAI value that indicates the presence of UCI.

If a WD 22 would multiplex UCI in a PUCCH transmission that overlaps with a PUSCH transmission without UL-SCH and that is not multiplexed with any aperiodic CSI in any of the multiple PUSCH, the WD 22 multiplexes the UCI in the PUSCH transmission and does not transmit the PUCCH. The overlapping PUSCH may be on the same or different SCell in which the PUCCH is scheduled.

If simultaneous PUCCH and PUSCH in the same cell is supported, the WD 22 may be configured e.g., by network node 16 to transmit UCI on both PUCCH and PUSCH at the same time if UCI duplication is configured.

Within the same PUCCH Cell group, if configured, the same PUCCH information may be duplicated on both a PUCCH SCell, and a PUSCH in the cell group.

Embodiment #5

In some embodiments, for a WD 22, the network node 16 may transmit a DL DCI (e.g., with format 1_1), which carries a PDSCH-to-HARQ feedback timing indicator indicating the timing for the corresponding DL HARQ acknowledgement/non-acknowledgement (A/N) in PUCCH. In addition, for the same expected DL HARQ A/N, the network node 16 may also schedule at least one UL grant on PUSCH to the same WD 22. If there is a configured grant available, the WD 22 may also use that configured grant to transmit the HARQ A/N. For the same WD 22, the PUCCH and PUSCHs may or may not belong to the same cell/BWP/LBT subband. The PUCCH and PUSCHs may or may not overlap in time. Depending on LBT outcome, the WD 22 may transmit DL HARQ A/N on PUCCH and/or PUSCH. The network node 16 may configure a rule on how to select PUCCH or PUSCH for the transmission. The selection conditions may also consider measured channel occupancy or LBT failure statistics.

In addition, some embodiments may include one or more of:

Embodiment A1. A network node configured to communicate with a wireless device (WD), the network node configured to, and/or comprising a radio interface and/or comprising processing circuitry configured to:

determine if at least one of an uplink (UL) primary cell (PCell), a primary secondary (PSCell) and a physical uplink control channel (PUCCH) secondary cell are available for receiving feedback information from the WD; and if at least one of the uplink (UL) primary cell (PCell), the primary secondary (PSCell) and the physical uplink control channel (PUCCH) secondary cell are not available for receiving feedback information from the WD, configure an UL PUCCH for the WD to transmit the feedback information without using the unavailable uplink (UL) primary cell (PCell), the primary secondary (PSCell) and the physical uplink control channel (PUCCH) secondary cell.

Embodiment A2. The network node of Embodiment A1, wherein the network node and/or the radio interface and/or the processing circuitry is further configured to configure the WD with multiple physical uplink control channel (PUCCH) groups, assign each PUCCH group one or more PUCCH-secondary cells (SCells) and use the assigned PUCCH-SCells to transmit the feedback information;

Embodiment A3. The network node of Embodiments A1 and A2, wherein the network node and/or the radio interface and/or the processing circuitry is further configured to confine PUCCH transmission within a sub-band or configure a PUCCH resource across multiple sub-bands and signal the WD to transmit the feedback information on a PUCCH resource of at least a subset of the multiple sub-bands.

Embodiment A4. The network node of any one of Embodiments A1-A3, wherein the network node and/or the radio interface and/or the processing circuitry is further configured to configure, using radio resource control (RRC), a PUCCH resource in an uplink (UL) carrier and use the PUCCH resource transmit the feedback information.

Embodiment A5. The network node of any one of Embodiments A1-A4, wherein the network node and/or the radio interface and/or the processing circuitry is further configured to, based on a downlink control information (DCI) indication, configure the WD to transmit physical uplink scheduling (PUSCH) without uplink (UL) scheduling (SCH) that carries hybrid automatic repeat request (HARQ) acknowledgement (ACK) uplink control information (UCI) and channel state information (CSI) and use at least one of the UCI and CSI to transmit the feedback information.

Embodiment A6. The network node of any one of Embodiments A1-A5, wherein the network node and/or the radio interface and/or the processing circuitry is further y configured to transmit downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and use the corresponding DL HARQ A/N in PUCCH to transmit the feedback information.

Embodiment A7. The network node of any one of Embodiments A1-A6, wherein the network node and/or the radio interface and/or the processing circuitry is further configured to configure the WD with multiple PUCCH-Cells within a PUCCH group and to transmit feedback information on only one PUCCH-Cell per PUCCH group in a slot.

Embodiment A8. The network node of any one of Embodiments A1-A7, wherein the network node and/or the radio interface and/or the processing circuitry is further configured to configure the WD with multiple PUCCH-Cells within a group and to duplicate the feedback information on at least one of all of the PUCCH-Cells within a PUCCH group; PUCCH-Cells in which the WD received DL scheduling; and a subset of PUCCH-Cells indicated by the network node.

Embodiment A9. The network node of any one of Embodiments A1-A8, wherein the network node and/or the radio interface and/or the processing circuitry is further configured to configure at least one of a PUCCH configuration and a PUCCH-scheduling request (SR) configuration across at least one of multiple PUCCH-cells and multiple listen before talk (LBT) subbands and configure the WD to use the configured at least one of a PUCCH configuration and a PUCCH-SR configuration to transmit the feedback information.

Embodiment B1. A method implemented in a network node, the method comprising: determining if at least one of an uplink (UL) primary cell (PCell), a primary secondary (PSCell) and a physical uplink control channel (PUCCH) secondary cell are available for receiving feedback information from a wireless device (WD); and if at least one of the uplink (UL) primary cell (PCell), the primary secondary (PSCell) and the physical uplink control channel (PUCCH) secondary cell are not available for receiving feedback information from the WD, configuring an UL PUCCH for the WD to transmit the feedback information without using the unavailable uplink (UL) primary cell (PCell), the primary secondary (PSCell) and the physical uplink control channel (PUCCH) secondary cell.

Embodiment B2. The method of Embodiment B1, further comprising configuring a WD with multiple physical uplink control channel (PUCCH) groups, assigning each PUCCH group one or more PUCCH-secondary cells (SCells) and using the assigned PUCCH-SCells to transmit the feedback information.

Embodiment B3. The method of Embodiments B1 and B2, further comprising confining PUCCH transmission within a sub-band or configuring a PUCCH resource across multiple sub-bands and signaling the WD to transmit the feedback information on a PUCCH resource of at least a subset of the multiple sub-bands.

Embodiment B4. The method of any one of Embodiments B1-B3, further comprising, using radio resource control (RRC), configuring a PUCCH resource in an uplink (UL) carrier and using the PUCCH resource to transmit the feedback information.

Embodiment B5. The method of any one of Embodiments B1-B4, further comprising, based on a downlink control information (DCI) indication, configuring the WD to transmit physical uplink scheduling (PUSCH) without uplink (UL) scheduling (SCH) that carries hybrid automatic repeat request (HARQ) acknowledgement (ACK) uplink control information (UCI) and channel state information (CSI) and using at least one of the UCI and CSI to transmit the feedback information.

Embodiment B6. The method of any one of Embodiments B1-B5, further comprising transmitting downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and using the corresponding DL HARQ A/N in PUCCH to transmit the feedback information.

Embodiment B7. The method of any one of Embodiments B1-B6, further comprising configuring the WD with multiple PUCCH-Cells within a PUCCH group and to transmit the feedback information on only one PUCCH-Cell per PUCCH group in a slot.

Embodiment B8. The method of any one of Embodiments B1-B7, further comprising configuring the WD with multiple PUCCH-Cells within a group and to duplicating the feedback information on at least one of all of the PUCCH-Cells within a PUCCH group; PUCCH-Cells in which the WD received DL scheduling; and a subset of PUCCH-Cells indicated by the network node.

Embodiment B9. The method of any one of Embodiments B1-B8, further comprising configuring at least one of a PUCCH configuration and a PUCCH-scheduling request (SR) configuration across at least one of multiple PUCCH-cells and multiple listen before talk (LBT) subbands and use the configured at least one of a PUCCH configuration and a PUCCH-SR configuration to transmit the feedback information.

Embodiment C1. A wireless device (WD) configured to communicate with a network node, the WD configured to, and/or comprising a radio interface and/or processing circuitry configured to:

determine if at least one of an uplink (UL) primary cell (PCell), a primary secondary (PSCell) and a physical uplink control channel (PUCCH) secondary cell are available for transmitting feedback information to the network node; and if at least one of the uplink (UL) primary cell (PCell), the primary secondary (PSCell) and the physical uplink control channel (PUCCH) secondary cell are not available for transmitting feedback information to the network node, use an UL PUCCH to transmit the feedback information without using the unavailable uplink (UL) primary cell (PCell), the primary secondary (PSCell) and the physical uplink control channel (PUCCH) secondary cell.

Embodiment C2. The WD of Embodiment C1, wherein the WD and/or the radio interface and/or the processing circuitry is further configured to use one or more PUCCH-SCells assigned to a PUCCH group to transmit the feedback information.

Embodiment C3. The WD of Embodiments C1 and C2, wherein the WD and/or the radio interface and/or the processing circuitry is further configured to confine PUCCH transmission within a sub-band or a subset of multiple sub-bands.

Embodiment C4. The WD of any one of Embodiments C1-C3, wherein the WD and/or the radio interface and/or the processing circuitry is further configured to use a radio resource control (RRC) configured PUCCH resource in an uplink (UL) carrier to transmit the feedback information.

Embodiment C5. The WD of any one of Embodiments C1-C4, wherein the WD and/or the radio interface and/or the processing circuitry is further configured to transmit physical uplink scheduling (PUSCH) without uplink (UL) scheduling (SCH) that carries hybrid automatic repeat request (HARQ) acknowledgement (ACK) uplink control information (UCI) and channel state information (CSI) and use at least one of the UCI and CSI to transmit the feedback information.

Embodiment C6. The WD of any one of Embodiments C1-05, wherein the WD and/or the radio interface and/or the processing circuitry is further configured to receive downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and use the corresponding DL HARQ A/N in PUCCH to transmit the feedback information.

Embodiment C7. The WD of any one of Embodiments C1-C6, wherein the WD and/or the radio interface and/or the processing circuitry is further configured to transmit PUCCH information on only one PUCCH-Cell per PUCCH group in a slot.

Embodiment C8. The WD of any one of Embodiments C1-C7, wherein the WD and/or the radio interface and/or the processing circuitry is further configured to duplicate the feedback information on at least one of all of the PUCCH-Cells within a PUCCH group; PUCCH-Cells in which the WD received DL scheduling; and a subset of PUCCH-Cells indicated by the network node.

Embodiment C9. The WD of any one of Embodiments C1-C8, wherein the WD and/or the radio interface and/or the processing circuitry is further configured to use at least one of a PUCCH configuration and a PUCCH-SR configuration to transmit the feedback information.

Embodiment D1. A method implemented in a wireless device (WD), the method comprising at least one of:
determining if at least one of an uplink (UL) primary cell (PCell), a primary secondary (PSCell) and a physical uplink control channel (PUCCH) secondary cell are available for transmitting feedback information to the network node; and
if at least one of the uplink (UL) primary cell (PCell), the primary secondary (PSCell) and the physical uplink control channel (PUCCH) secondary cell are not available for transmitting feedback information to the network node, configured to use an UL PUCCH configured by the network node to transmit the feedback information without using the unavailable uplink (UL) primary cell (PCell), the primary secondary (PSCell) and the physical uplink control channel (PUCCH) secondary cell.

Embodiment D2. The method of Embodiment D1, further comprising using one or more PUCCH-SCells assigned to a PUCCH group to transmit the feedback information.

Embodiment D3. The method of Embodiment D1 and D2, further comprising confining PUCCH transmission within a sub-band or a subset of multiple sub-bands.

Embodiment D4. The method of any one of Embodiments D1-D3, further comprising using a radio resource control (RRC) configured PUCCH resource in an uplink (UL) carrier to transmit the feedback information.

Embodiment D5. The method of any one of Embodiments D1-D4, further comprising transmitting physical uplink scheduling (PUSCH) without uplink (UL) scheduling (SCH) that carries hybrid automatic repeat request (HARQ) acknowledgement (ACK) uplink control information (UCI) and channel state information (CSI) and using at least one of the UCI and CSI to transmit the feedback information.

Embodiment D6. The method of any one of Embodiments D1-D5, further comprising receiving downlink (DL) DCI which carries a physical downlink scheduling channel (PDSCH)-to-HARQ feedback timing indicator indicating the timing for a corresponding DL HARQ acknowledgment/non-acknowledgment (A/N) in PUCCH and using the corresponding DL HARQ A/N in PUCCH to transmit the feedback information.

Embodiment D7. The method of any one of Embodiments D1-D6, further comprising transmitting the feedback information on only one PUCCH-Cell per PUCCH group in a slot.

Embodiment D8. The method of any one of Embodiments D1-D7, further comprising duplicating the feedback information on at least one of all of the PUCCH-Cells within a PUCCH group; PUCCH-Cells in which the WD received DL scheduling; and a subset of PUCCH-Cells indicated by the network node.

Embodiment D9. The method of any one of Embodiments D1-D8, further comprising using at least one of a PUCCH configuration and a PUCCH-SR configuration to transmit the feedback information.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device (WD), the method comprising:
receiving a configuration for a plurality of channels, the configuration configuring each of the plurality of channels with at least one physical uplink control channel (PUCCH) resource; and
transmitting feedback on the at least one PUCCH resource that is configured in at least one channel of the plurality of channels, wherein the received configuration configures the WD with a plurality of sub-band PUCCH groups, wherein each sub-band PUCCH group of the plurality of sub-band PUCCH groups is assigned one or more PUCCH secondary cells (PUCCH-SCells) or one or more PUCCH-Cells, wherein the WD transmits the feedback on a PUCCH resource of at least a first subset of the plurality of sub-band PUCCH groups, and wherein the at least one channel on which the feedback is transmitted is a same channel that the WD received a corresponding downlink scheduling to which the feedback is related.

2. The method of claim 1, wherein the at least one channel on which the feedback is transmitted is based at least in part on a Listen-before-talk (LBT) category associated with the at least one channel.

3. The method of claim 2, further comprising:
receiving a downlink control information (DCI), wherein the LBT category is based on LBT information indicated in the DCI.

4. The method of claim 1, wherein the at least one channel on which the feedback is transmitted corresponds to the at least one channel within a PUCCH group in which a Listen-before-talk (LBT) procedure is not used.

5. The method of claim 1, wherein the at least one channel on which the feedback is transmitted is based at least in part on a lowest serving cell index within a PUCCH group.

6. The method of claim 1, wherein the at least one channel on which the feedback is transmitted corresponds to the at least one channel having a shortest sensing duration within a PUCCH group.

7. The method of claim 1, wherein the at least one channel on which the feedback is transmitted corresponds to the at least one channel associated with at least one of a lowest channel occupancy and a lowest Listen-before-talk (LBT) failure statistic.

8. The method of claim 1, further comprising:
transmitting at least one duplicate of the feedback for at least one of:
all the channels of the plurality of channels within a PUCCH group;
channels for which the WD received a downlink scheduling; and
a subset of the plurality of channels explicitly indicated by a network node.

9. The method of claim 1, further comprising:
receiving at least one downlink control information (DCI) comprising at least one index indicating the at least one channel to be used for the feedback transmission; and the at least one DCI comprising the at least one index received by the WD is duplicated in all downlink channels associated with the WD.

10. The method of claim 1, further comprising:
receiving signaling indicating a set of channel candidates for the feedback transmission; and
selecting the at least one channel out of the indicated set of channel candidates for the feedback transmission, wherein transmitting the feedback comprises transmitting the feedback on the selected at least one channel.

11. The method of claim 10, wherein selecting the at least one channel out of the indicated set of channel candidates further comprises:
selecting the at least one channel out of the indicated set of channel candidates for the feedback transmission based at least in part on at least one of:
a predefined order;
the at least one channel associated with a downlink transmission;
the at least one channel associated with an uplink transmission;
the at least one channel associated with a Listen-before-talk (LBT) category;
the at least one channel in which an LBT procedure is not used;
the at least one channel associated with a lowest serving cell index within a PUCCH group;
the at least one channel having a shortest sensing duration within a PUCCH group;
the at least one channel associated with at least one of a lowest channel occupancy and a lowest Listen-before-talk (LBT) failure statistic; and
the at least one channel in which the WD received a downlink scheduling.

12. The method of claim 1, further comprising:
if the at least one PUCCH resource overlaps a physical uplink shared channel (PUSCH) transmission, multiplexing the feedback with the PUSCH transmission.

13. The method of claim 1, further comprising:
receiving a downlink control information (DCI) the DCI indicating a timing for the feedback on the at least one PUCCH resource;
receiving an uplink (UL) grant on a physical uplink shared channel (PUSCH); and
based at least in part on a Listen-before-talk (LBT) outcome, selecting one of the at least one PUCCH resource and the PUSCH to transmit the feedback.

14. A method implemented in a network node configured to communicate with a wireless device (WD), the method comprising:
transmitting a configuration for a plurality of channels, the configuration configuring each of the plurality of channels with at least one physical uplink control channel (PUCCH) resource; and
receiving feedback on the at least one PUCCH resource that is configured in at least one channel of the plurality of channels, wherein the configuration configures the WD with a plurality of sub-band PUCCH groups, wherein each sub-band PUCCH group of the plurality of sub-band PUCCH groups is assigned one or more PUCCH secondary cells (PUCCH-SCells) or one or more PUCCH-Cells, wherein the WD receives the feedback on a PUCCH resource of at least a first subset of the plurality of sub-band PUCCH groups, and wherein the at least one channel on which the feedback is received is a same channel that the WD received a corresponding downlink scheduling to which the feedback is related.

15. The method of claim 14, wherein the at least one channel on which the feedback is received is based at least in part on a Listen-before-talk (LBT) category associated with the at least one channel.

16. The method of claim 15, further comprising:
transmitting a downlink control information (DCI), wherein the LBT category is based on LBT information indicated in the DCI.

17. A wireless device (WD) comprising processing circuitry, the processing circuitry configured to cause the WD to:
receive a configuration for a plurality of channels, the configuration configuring each of the plurality of channels with at least one physical uplink control channel (PUCCH) resource; and
transmit feedback on the at least one PUCCH resource that is configured in at least one channel of the plurality of channels, wherein the received configuration configures the WD with a plurality of sub-band PUCCH groups, wherein each sub-band PUCCH group of the plurality of sub-band PUCCH groups is assigned one or more PUCCH secondary cells (PUCCH-SCells) or one or more PUCCH-Cells, wherein the WD transmits the feedback on a PUCCH resource of at least a first subset of the plurality of sub-band PUCCH groups, and wherein the at least one channel on which the feedback is transmitted is a same channel that the WD received a corresponding downlink scheduling to which the feedback is related.

18. The WD of claim 17, wherein the processing circuitry is further configured to cause the WD to:
receive a downlink control information (DCI), wherein the LBT category is based on LBT information indicated in the DCI.

19. A network node configured to communicate with a wireless device (WD), the network node comprising processing circuitry, the processing circuitry configured to cause the network node to:
transmit a configuration for a plurality of channels, the configuration configuring each of the plurality of channels with at least one physical uplink control channel (PUCCH) resource; and
receive feedback on the at least one PUCCH resource that is configured in at least one channel of the plurality of channels, wherein the configuration configures the WD with a plurality of sub-band PUCCH groups, wherein each sub-band PUCCH group of the plurality of sub-band PUCCH groups is assigned one or more PUCCH secondary cells (PUCCH-SCells) or one or more PUCCH-Cells, wherein the WD receives the feedback on a PUCCH resource of at least a first subset of the plurality of sub-band PUCCH groups, and wherein the at least one channel on which the feedback is received is a same channel that the WD received a corresponding downlink scheduling to which the feedback is related.

20. The network node of claim 19, wherein the processing circuitry is further configured to cause the network node to:
transmit a downlink control information (DCI), wherein the LBT category is based on LBT information indicated in the DCI.

* * * * *